(12) United States Patent
Higashiura et al.

(10) Patent No.: US 10,101,703 B2
(45) Date of Patent: Oct. 16, 2018

(54) IMAGE FORMING APPARATUS

(71) Applicant: SHARP KABUSHIKI KAISHA, Osaka-shi, Osaka (JP)

(72) Inventors: Masaki Higashiura, Osaka (JP); Takeshi Tani, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 554 days.

(21) Appl. No.: 14/390,191

(22) PCT Filed: May 8, 2013

(86) PCT No.: PCT/JP2013/062906
§ 371 (c)(1),
(2) Date: Oct. 2, 2014

(87) PCT Pub. No.: WO2013/172228
PCT Pub. Date: Nov. 21, 2013

(65) Prior Publication Data
US 2016/0028909 A1    Jan. 28, 2016

(30) Foreign Application Priority Data
May 15, 2012   (JP) ................................. 2012-111349

(51) Int. Cl.
*G03G 15/00*     (2006.01)
*H04N 1/00*      (2006.01)

(52) U.S. Cl.
CPC ......... *G03G 15/655* (2013.01); *H04N 1/0032* (2013.01); *H04N 1/00623* (2013.01); *H04N 2201/0094* (2013.01)

(58) Field of Classification Search
None
See application file for complete search history.

(56) References Cited

U.S. PATENT DOCUMENTS

2009/0201534 A1*  8/2009  Truong ................ G03G 15/655
                                                358/1.15
2009/0230606 A1*  9/2009  Yokomizo ............. B65H 33/04
                                                270/52.03
2009/0304409 A1* 12/2009  Matoba .............. H04N 1/00413
                                                399/82

FOREIGN PATENT DOCUMENTS

JP      11-119488 A      4/1999
JP      2001-75431 A     3/2001
(Continued)

*Primary Examiner* — Nicholas Pachol
(74) *Attorney, Agent, or Firm* — Birch, Stewart, Kolasch & Birch, LLP

(57) ABSTRACT

An image forming apparatus 100 allowing insertion of an insert-sheet between discharged sheets of recording paper includes: an image forming unit 122 forming an image on the recording paper; an operation unit 130 designating an insertion position for inserting the insert-sheet; a discharge unit discharging the sheets of recording paper having images formed and the insert-sheet; and a control unit 102 controlling timing for inserting the insert-sheet. The insertion position is designated by a copy-by-copy basis with one copy being a set of sheets of recording paper having all images included in a job instructing image formation on the recording paper formed thereon. The control unit 102 controls the discharge unit such that the sheets of recording paper having the image formed thereon are discharged by the number determined from the insertion position and thereafter the insert-sheet is discharged.

6 Claims, 30 Drawing Sheets

(56) References Cited

FOREIGN PATENT DOCUMENTS

| | | |
|---|---|---|
| JP | 2001-199140 A | 7/2001 |
| JP | 2004-224453 A | 8/2004 |
| JP | 2004-224518 A | 8/2004 |
| JP | 2006-184594 A | 7/2006 |
| JP | 2006-344106 A | 12/2006 |
| JP | 2007-76191 A | 3/2007 |
| JP | 2009-292580 A | 12/2009 |
| JP | 2010-222067 A | 10/2010 |
| JP | 2011-78038 A | 4/2011 |
| JP | 2011-97206 A | 5/2011 |

* cited by examiner

IMAGE FORMING APPARATUS

TECHNICAL FIELD

The present invention relates to an image forming apparatus capable of inserting an insert-sheet indicating separation, at any position designated on a copy-by-copy basis, among a plurality of sheets of paper discharged after image formation.

BACKGROUND ART

As one type of image processing apparatuses as electronic equipment, an image forming apparatus (typically a copy machine) for forming an image on a sheet of recording paper has been introduced to many places of business (companies and offices). In such a place of business, it is a common practice to have an image forming apparatus having a copy function or a printer function connected to a network and to share the apparatus by a plurality of users. An MFP (MultiFunction Peripheral) as one type of such image forming apparatuses has a plurality of basic operational modes including a copy mode, a facsimile mode (hereinafter facsimile will be also denoted as FAX), a network compatible printer mode and a scanner mode.

In addition to the functions for image formation (copy and print), an image forming apparatus has functions allowing users to more easily handle prints. As one such function, a function of inserting insert-sheets to indicate separation among the printed sheets has been known. By way of example, Japanese Patent Laying-Open No. 2001-75431 discloses an image forming apparatus intended for schools, allowing easy handling after paper discharge. According to the description of this reference, in the image forming apparatus, when the insert-sheet mode is selected, a prescribed sheet of paper is inserted between each copy, that is, every time a set of prints is discharged.

DISCLOSURE OF THE INVENTION

Problems to be Solved by the Invention

As described above, conventionally, setting to insert an insert-sheet between each set of copies or to a designated page has been possible. It has been impossible, however, to insert sheets to separate designated copies from other copies. If different number of copies is to be distributed to different departments, for example, it is necessary for a user to count each necessary number of copies for each department from discharged sets of copies having insert-sheets inserted therebetween. This is a troublesome task. Further, there may be a case where insert-sheets are inserted to unnecessary positions, wasting paper.

Therefore, an object of the present invention is to provide an image forming apparatus capable of inserting an insert-sheet indicating separation at any position designated on a copy-by-copy basis, among a plurality of sheets of paper discharged after image formation.

Means for Solving the Problems

The above-described object can be attained by the following.

Specifically, the present invention provides an image forming apparatus allowing insertion of an insert-sheet indicating separation between a plurality of sheets of recording paper each having an image formed on its surface and then discharged. The image forming apparatus includes: an image forming unit forming an image on the recording paper; an input unit designating an insertion position to insert the insert-sheet; a discharge unit discharging the recording paper having the image formed thereon and the insert-sheet; and a control unit controlling the discharge unit. The insertion position is designated on a copy-by-copy basis with one copy being a set of sheets of recording paper on which all images included in a job instructing image formation on the recording paper are formed. The control unit causes the discharge unit to discharge the sheets of recording paper having the images formed thereon by the number of copies determined from the insertion position, and thereafter to discharge the insert-sheet.

Preferably, the input unit includes: a display unit displaying pieces of information each indicating each of the number of the sets on which image formation is instructed, in a manner distinguishable from each other and in the order of discharge of the sets; and an insertion designating unit designating the insertion position by designating whether or not the insert-sheet is to be inserted between the pieces of information indicating consecutively discharged two sets.

More preferably, the image forming apparatus further includes an insert-sheet designating unit designating a paper feed tray from which the insert-sheet is fed. The control unit causes the discharge unit to pick up and discharge the insert-sheet from the paper feed tray designated by the insert-sheet designating unit.

More preferably, the image forming apparatus further includes a size designating unit designating a size of the insert-sheet. The control unit includes a determining unit determining whether an insert-sheet of the size designated by the size designating unit can be discharged to a discharge destination to which the recording paper having the image formed thereon is discharged; and in response to a determination by the determining unit that the insert-sheet cannot be discharged to the discharge destination to which the recording paper having the image formed thereon is discharged, the control unit controls the discharge unit such that a sheet of recording paper is picked up from a tray containing the recording paper on which the image is to be formed and this sheet is discharged in place of the insert-sheet.

Preferably, the image forming apparatus further includes a character input unit allowing input of a character. The image forming unit forms an image of the character input by the character input unit, on the insert-sheet before it is discharged.

More preferably, the image forming unit forms, on an insert-sheet to be discharged first, an image indicating a value larger by 1 than the number of sets discharged before discharge of the insert-sheet to be discharged first, and forms, on each of the insert-sheets to be discharged second and thereafter, an image indicating a value larger by 1 than the number of sets discharged after the immediately preceding discharged insert-sheet until immediately before each of the insert-sheets to be discharged second and thereafter.

More preferably, the input unit includes a designating unit designating any of positions before and after all sheets of recording paper having images of the job formed thereon and discharged, and before and after every prescribed number of copies of sheets of recording paper having images of the job formed thereon and discharged, as the insertion position.

Effects of the Invention

By the present invention, when a plurality of sets of prints are to be provided, insert-sheets can be inserted at any number of copies as designated by the user. Since the insert-sheets can be inserted at positions designated on the copy-by-copy basis, the user can easily separate many sets of prints. Further, since insert-sheets are not inserted to unnecessary positions, waste of paper can be prevented.

Further, since the number of copies or designated characters are printed on each insert-sheet, the user has only to separate the prints before and after the insert-sheet without the necessity of counting the number of copies.

DESCRIPTION OF EMBODIMENTS

Figure 1:
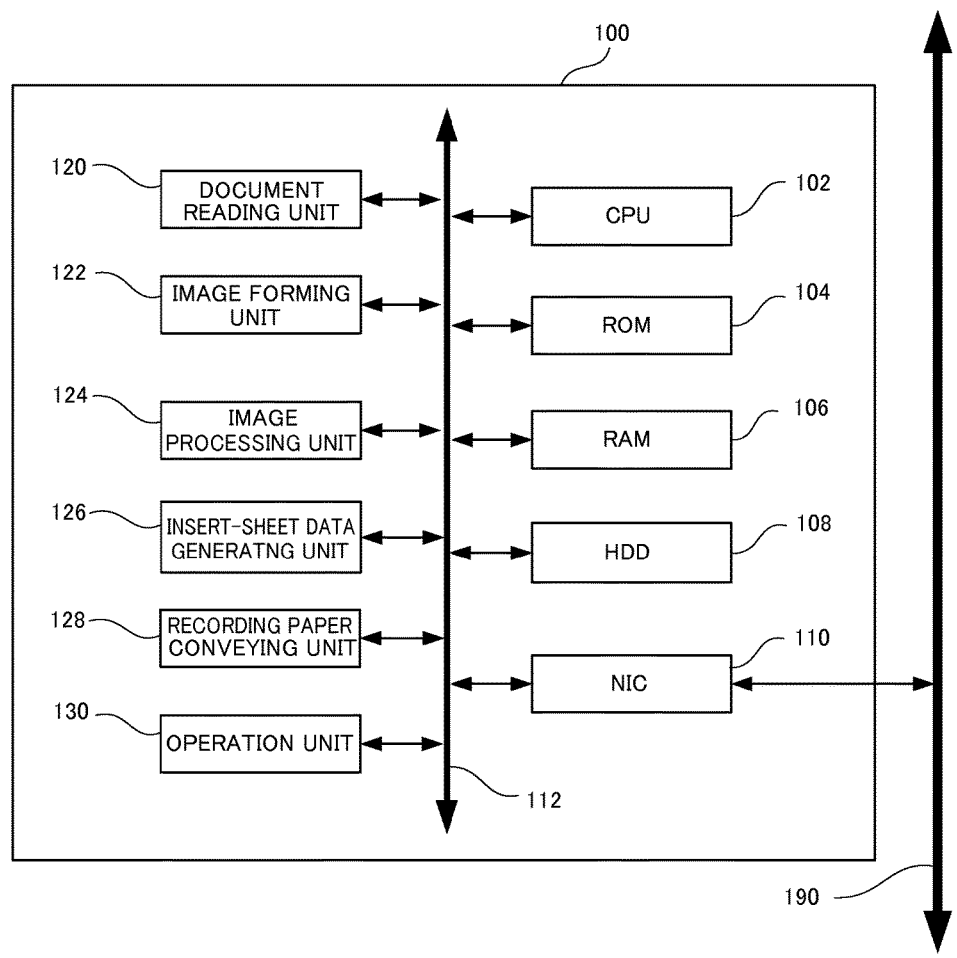
FIG. 1 is a block diagram showing a configuration of the image forming apparatus in accordance with an embodiment of the present invention.

In the following embodiments, the same components are denoted by the same reference characters. Their names and functions are also the same. Therefore, detailed description thereof will not be repeated.

The image forming apparatus in accordance with the embodiment of the present invention is a digital multifunctional peripheral having a plurality of functions including copy, print, scanner and facsimile functions. Referring to FIG. 1, image forming apparatus 100 includes: a CPU (Central Processing Unit) 102 for overall control of image forming apparatus 100; an ROM (Read Only Memory) 104 for storing programs and the like; an RAM (Random Access Memory) 106, which is volatile storage; and an HDD (Hard Disk Drive) 108, which is non-volatile storage that retains data even when power is turned off. ROM 104 stores programs and data necessary for controlling operations of image forming apparatus 100.

Image forming apparatus 100 further includes an NIC (Network Interface Card) 110, a document reading unit 120, an image forming unit 122, an image processing unit 124, an insert-sheet data generating unit 126, a recording paper conveying unit 128, an operation unit 130 and a bus 112.

CPU 102, ROM 104, RAM 106, HDD 108, NIC 110, document reading unit 120, image forming unit 122, image processing unit 124, insert-sheet data generating unit 126, recording paper conveying unit 128 and operation unit 130 are connected to bus 112. Data (including control information) are exchanged among these components and units through bus 112. CPU 102 reads a program from ROM 104 through bus 112 to RAM 106 and executes the program using a part of RAM 106 as a work area. Specifically, CPU 102 controls various components and units forming image forming apparatus 100 and realizes each of the functions of image forming apparatus 100 in accordance with a program or programs stored in ROM 104.

In addition to these components, image forming apparatus 100 includes a paper feeding unit containing sheets of paper on which images are to be formed, a paper discharge unit (discharge tray) for discharging sheets of recording paper on which images have been formed, a FAX modem (not shown) connected to a telephone line to enable FAX communication, and a power source unit (not shown) for feeding electric power to various components.

Document reading unit 120 reads a document by means of a CCD (Charge Coupled Device) and generates image data (digital signals). Image data is temporarily stored in RAM 106. Image processing unit 124 performs various image processing operations on the read image data. The image data is stored in HDD 108 as needed.

Insert-sheet data generating unit 126 generates, on RAM 106, image data (such as text image data) to be formed on the insert-sheet. The generated image data is stored in HDD 108 as needed. The "insert-sheet" refers to a sheet to be inserted between discharged sheets of recording paper to enable easy recognition where the printed and discharged sheets of recording paper are separated.

Figure 2:
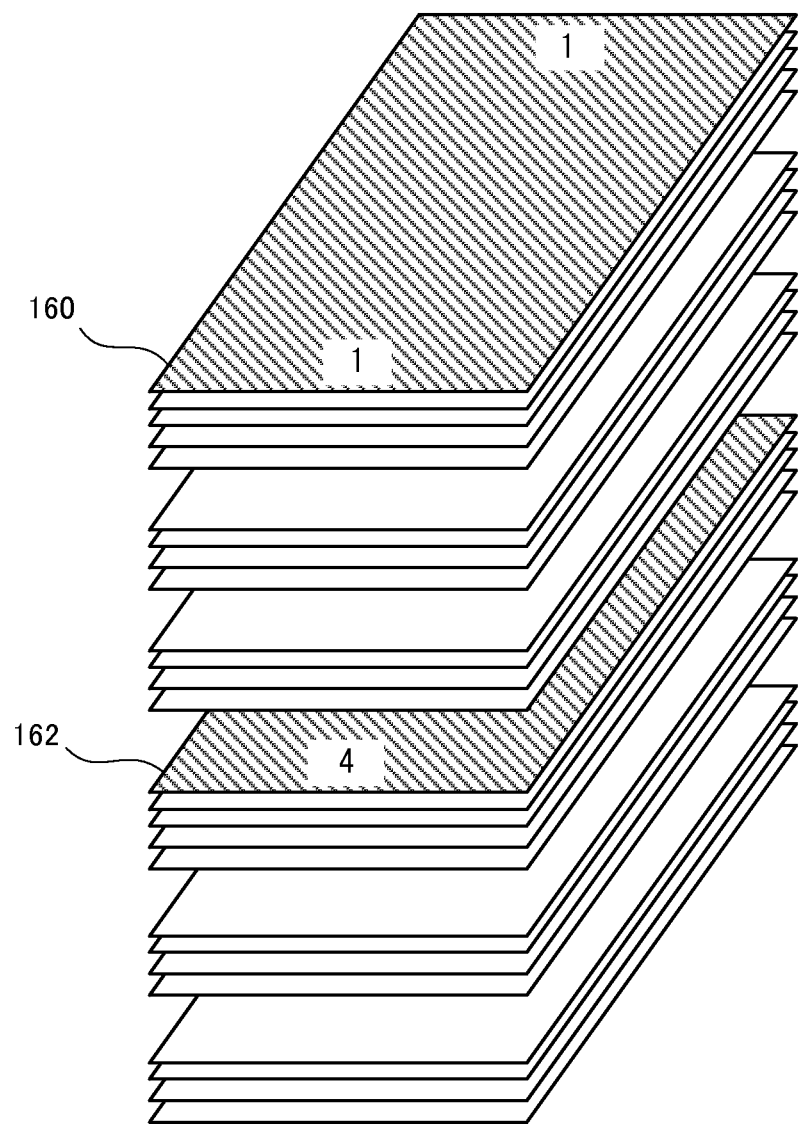
FIG. 2 is a perspective view showing insert-sheets inserted to copies.

Image forming unit 122 forms an image on a sheet of recording paper or on an insert-sheet conveyed by recording paper conveying unit 128, based on the image data (including the image data to be formed on the insert-sheet) on RAM 106. FIG. 2 shows six copies of sheets of recording paper on which images have been formed, with two insert-sheets 160 and 162, indicated by hatchings, inserted therebetween. On insert-sheet 160, a character image "1" is formed, indicating the first set. On insert-sheet 162, a character image "4" is formed, indicating the fourth set.

Figure 3:
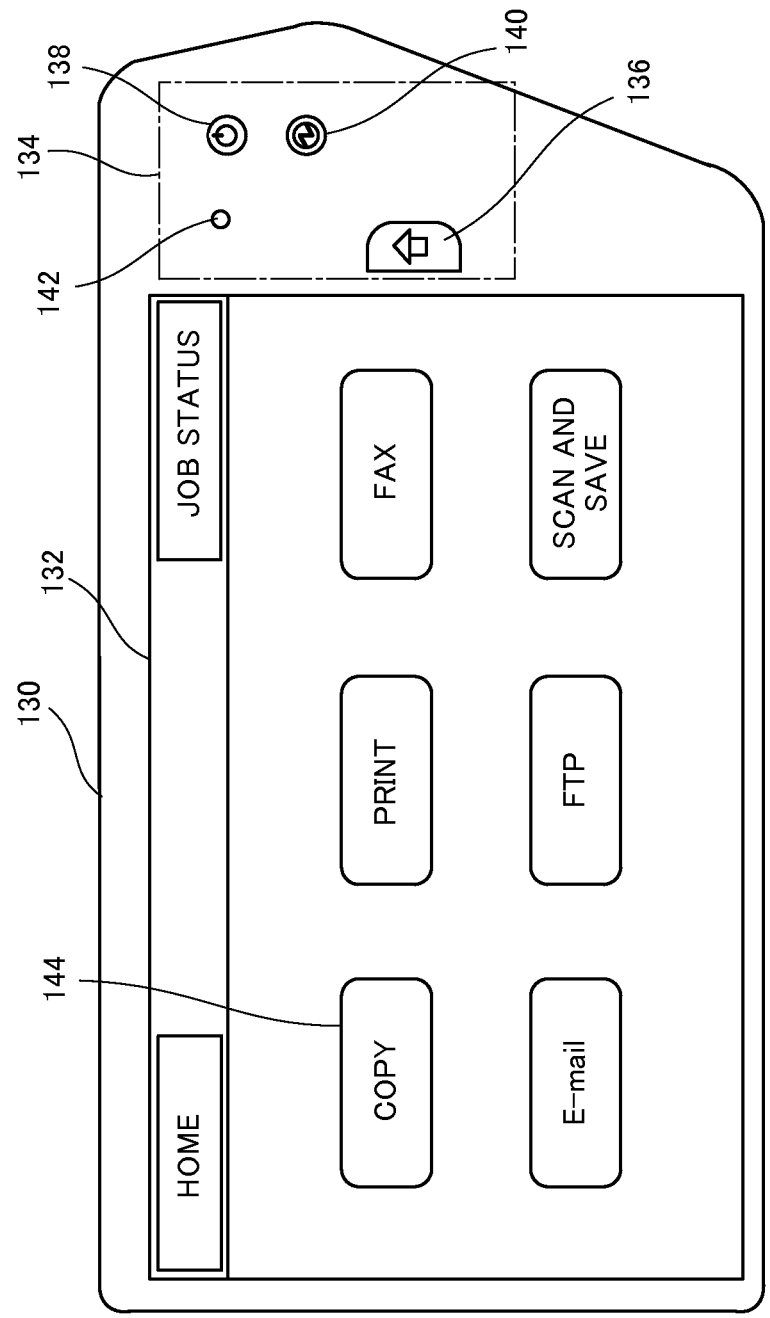
FIG. 3 is a plan view showing an operation unit of the image forming apparatus in accordance with an embodiment of the present invention.

Referring to FIG. 3, operation unit 130 includes a touch-panel display 132 and an operation key unit 134. Touch-panel display 132 includes a display panel implemented by a liquid crystal panel or the like, and a touch-panel arranged on the display panel and detecting a touched position. In FIG. 3, on touch-panel display 132 (display panel) of operation unit 130, a home screen image of image forming apparatus 100 is displayed. On the home screen image, keys for giving instruction of copying, printing and the like are displayed.

On operation key unit 134, as hardware keys, a home key 136, a power key 138 for turning on/off the power of image forming apparatus 100, a power save key 140 causing image forming apparatus 100 to enter a power saving state or to resume a normal state from the power saving state, and an LED lamp 142 lit when the power is on, are arranged. Images displayed on touch-panel display 132 change variously (make image transitions) in accordance with the states of image forming apparatus 100. Home key 136 is to return the screen image displayed on touch-panel display 132 to the home screen image. Specifically, when home key 136 is pressed, the home screen image is displayed on touch-panel display 132.

Operation unit 130 receives inputs such as an instruction by the user to image forming apparatus 100. The user confirms the state and job processing status of image forming apparatus 100, by the screen images displayed on touch-panel display 132. The user can set functions and instruct operations of image forming apparatus 100 by selecting keys displayed on touch-panel display 132 on the touch-panel superposed on the display panel (by touching the corresponding portions on the touch-panel).

NIC 110 is an interface connected to an external network 190 enabling image forming apparatus 100 to communicate with an external apparatus through network 190. Image forming apparatus 100 includes a FAX modem (not shown) as an interface connected to an external telephone line (not shown) enabling FAX communication of image forming apparatus 100 with an external apparatus through the telephone line.

Figure 4:
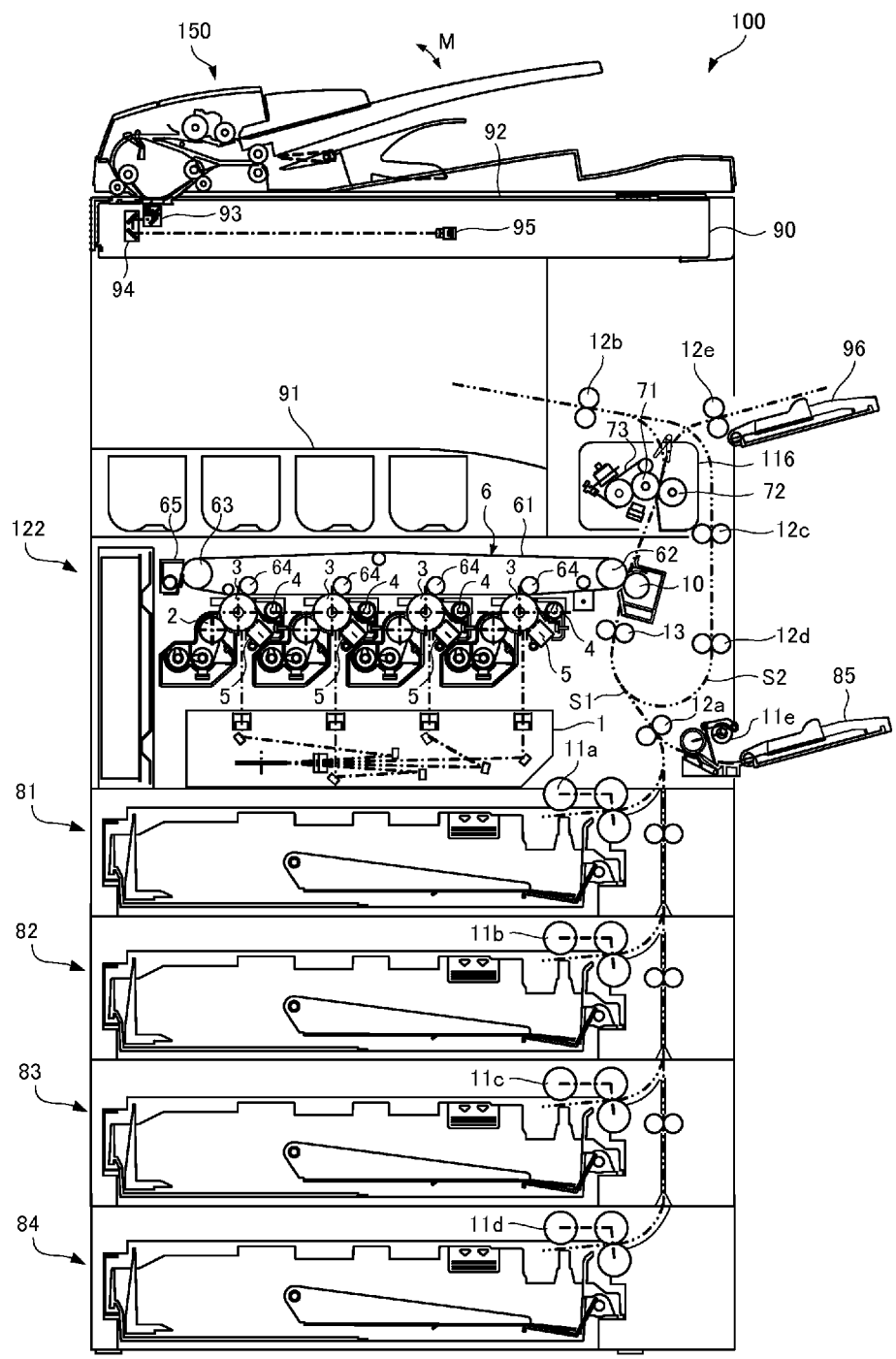
FIG. 4 is a cross-sectional view showing a configuration of the image forming apparatus in accordance with the embodiment of the present invention.

Referring to FIG. 4, conveyance of recording paper and image formation on the recording paper in image forming apparatus 100 will be described in greater detail. Here, image formation on a sheet of recording paper will be described. The image formation on an insert-sheet is done in the similar manner.

Document reading unit 120 includes an image reading device 90 and an automatic document feeder (ADF) 150.

Image reading device 90 includes a platen 92 formed of a transparent glass for placing a document, and it is a reduction optical system formed of a light source unit 93 holding a light source and a first mirror, a mirror unit 94 holding second and third mirrors, and a lens and CCD 95.

On platen 92, automatic document feeder 150 is mounted. Automatic document feeder 150 automatically feeds documents to platen 92. Automatic document feeder 150 is configured to rotate in the direction of an arrow M and when opened, platen 92 is accessible and a document can be manually placed on platen 92.

Image forming unit 122 is configured to include an optical scanning device 1, a developer 2, a photoreceptor drum 3, a cleaner unit 4, a charger 5, an intermediate transfer belt unit 6, a fixing unit 116, paper feed trays 81 to 85, and paper discharge trays 91 and 96. Paper feed tray 85 is a manual feed tray.

The image data handled in the present image forming apparatus 100 are color image data using colors of black (hereinafter also denoted as "K"), cyan (hereinafter also denoted as "C"), magenta (hereinafter also denoted as "M") and yellow (hereinafter also denoted as "Y"), that is, image data separated to components of these four colors. Therefore, in order to form four different latent images of respective colors, four developers 2, four photoreceptor drums 3, four chargers 5 and four cleaner units 4 are provided. These components form four image stations for processing black, cyan, magenta and yellow, respectively.

Charger 5 is a device for uniformly charging the surface of photoreceptor drum 3 to a prescribed potential. Optical scanning device 1 is a laser scanning unit (LSU) including a laser emitting unit and a reflection mirror. In optical scanning device 1, a polygon mirror for laser beam scanning and an optical element including a lens and a mirror for guiding the laser beam reflected by the polygon mirror to photoreceptor drum 3 are arranged.

Optical scanning device 1 exposes the charged photoreceptor drum 3 in accordance with the input image data, and thereby forms an electrostatic latent image in accordance with the image data on the surface. Developer 2 turns the electrostatic latent images formed on respective photoreceptor drums 3 to visible images with toners of four colors (YMCK), respectively. Cleaner unit 4 removes and recovers the toner left on the surface of each photoreceptor drum 3, after development and image transfer.

Intermediate transfer belt unit 6 arranged above photoreceptor drum 3 includes an intermediate transfer belt 61, an intermediate transfer belt driving roller 62, an intermediate transfer belt driven roller 63, an intermediate transfer roller 64 and an intermediate transfer belt cleaning unit 65. There are four intermediate transfer rollers 64, corresponding to respective colors of Y, M, C and K.

Around intermediate transfer belt driving roller 62, intermediate transfer belt driven roller 63, and intermediate transfer roller 64, intermediate transfer belt 61 is wound and driven to rotate. Each intermediate transfer roller 64 supplies transfer bias, which will be described later, for transferring the toner image on the corresponding photoreceptor drum 3 to intermediate transfer belt 61.

Intermediate transfer belt 61 is provided to be in contact with each photoreceptor drum 3. By successively transferring the toner images of respective colors formed on photoreceptor drums 3 onto intermediate transfer belt 61 to be superposed on the last, a color toner image (multi-color toner image) is formed on intermediate transfer belt 61.

Transfer of the toner image from photoreceptor drum 3 to intermediate transfer belt 61 is done by intermediate transfer roller 64 that is in contact with the back side of intermediate transfer belt 61. A high voltage transfer bias (high voltage of a polarity (+) opposite to the charged polarity (−) of the toner) is applied to intermediate transfer roller 64, in order to transfer the toner image. Intermediate transfer roller 64 has a metal shaft (for example, of stainless steel) of 8 to 10 mm in diameter as a base, with its surface covered by a conductive elastic member (such as EPDM or urethane foam). Because of this conductive elastic member, uniform high voltage can be applied to intermediate transfer belt 61.

The electrostatic images turned to visual images in accordance with the hue on respective photoreceptor drums 3 as described above are superposed on intermediate transfer belt 61. Information of the thus superposed images (density distribution of toner) is transferred to a sheet of recording paper, as intermediate transfer belt 61 is rotated, by a transfer roller 10 arranged at the position of contact between the intermediate transfer belt 61 and the sheet of recording paper.

At this time, intermediate transfer belt 61 and transfer roller 10 are brought into pressure-contact with a prescribed nip, and a voltage (high voltage of a polarity (+) opposite to the charged polarity (−) of the toner) for transferring the toner to the sheet of recording paper is applied to transfer roller 10. Further, in order to constantly secure the nip mentioned above, a hard material (metal or the like) is used for one of the transfer roller 10 and intermediate transfer belt driving roller 62, and a soft material such as soft roller (elastic rubber roller, foam resin roller or the like) is used for the other one.

As described above, the toner adhering to intermediate transfer belt 61 by the contact with photoreceptor drum 3, or toner not transferred to the sheet of recording paper by transfer roller 10 but left on intermediate transfer belt 61 may cause undesirable mixture of toner colors in subsequent process steps. Therefore, the adhered toner and the left toner are removed and recovered by intermediate transfer belt cleaning unit 65. In intermediate transfer belt cleaning unit 65, a cleaning blade that is brought into contact with intermediate transfer belt 61 is provided as a cleaning member. Intermediate transfer belt 61 is supported by intermediate transfer belt driven roller 63 at a portion where the cleaning blade contacts.

Paper feed trays 81 to 84 are trays for storing sheets of recording paper used for image formation, provided below optical scanning device 1. Sheets of recording paper for image formation can also be placed on manual paper feed tray 85. Paper discharge trays 91 and 95 are for collecting the printed sheets of paper in a face-down manner, that is, with the printed surface facing downward.

For feeding sheets of recording paper in paper feed trays 81 to 84 and manual paper feed tray 85 to paper discharge tray 91 or 96 through transfer roller 10 and fixing unit 116, recording paper conveying paths S1 and S2 are formed in image forming unit 122. In the vicinity of recording paper conveying paths S1 and S2 from paper feed trays 81 to 84 or manual paper feed tray 85 to discharge tray 91 or 96, pick-up rollers 11a to 11e, conveyer roller pairs 12a to 12e, registration roller pair 13, a transfer roller 10, fixing unit 116 and the like are arranged.

Paper feed trays 81 to 84, manual paper feed tray 85, pick-up rollers 11a to 11e, conveyer roller pairs 12a to 12e and registration roller pair 13 form the recording paper conveying unit 128 shown in FIG. 1.

A plurality of conveyer roller pairs 12a to 12e are small rollers for promoting and assisting feeding of the recording paper, and are provided along paper feeding paths S1 and S2. Pick-up rollers 11a to 11d are arranged near one end of paper feed trays 81 to 84, respectively, pick up sheets of recording paper one by one from paper feed trays 81 to 84, respectively, and supply the sheets to paper feeding path S1. Similarly, pick-up roller 11e is arranged near one end of manual paper feed tray 85, picks up sheets of recording paper one by one from manual paper feed tray 85 and supplies the sheets to paper feeding path S1.

Registration roller pair 13 temporarily holds the sheet of recording paper fed along paper feeding path S1, and feeds the sheet of recording paper to transfer roller 10 at such timing when the leading edge of toner image on photoreceptor drum 3 is aligned with the leading edge of the sheet of recording paper.

Fixing unit 116 includes a heat roller 71 and a pressure roller 72. Heat roller 71 and pressure roller 72 rotate, with the sheet of recording paper pinched therebetween. Heat roller 71 is set to a prescribed fixing temperature by CPU 102, based on a signal from a temperature detector (not shown). Heat roller 71 presses with heat, together with pressure roller 72, the toner to the sheet of recording paper, and thus, it has a function of melting, mixing and causing pressure-contact of multi-color toner image that has been transferred to the sheet of recording paper and thereby heat-fixing the image on the sheet of recording paper. Further, an external heating belt 73 for heating heat roller 71 from outside is provided.

In the following, each of the modes for executing the functions available on image forming apparatus 100 (copy function, printer function, scanner function and facsimile function) will be briefly described.

(Copy Mode)

When image forming apparatus 100 is used as a copy machine, image data of the document read by document reading unit 120 is output as a copy from image forming unit 122.

Image data read by the CCD 95 provided at document reading unit 120 is completed as output data (print data) on RAM 106, and stored in HDD 108. If there is a plurality of documents, the reading and storage operations are repeated. Thereafter, based on the process mode instructed from operation unit 130, the image data stored in HDD 108 is successively read at appropriate timing and transmitted to RAM 106.

At paper feed unit, a sheet of recording paper is drawn by a pick-up roller and conveyed by a plurality of conveyer roller pairs 12a to 12e to image forming unit 122. At image forming unit 122, a charged photoreceptor drum 3 is exposed in accordance with the input image data, whereby an electrostatic latent image corresponding to the image data is formed on a surface of photoreceptor drum 3. Toner is applied to the electrostatic latent image portions on the photoreceptor drum 3 and, thereafter, the toner image is transferred by intermediate transfer belt 61 to a sheet of recording paper. Thereafter, the sheet of recording paper is heated and pressed (whereby the image is fixed on the sheet of paper), and then the sheet is discharged to the paper discharge tray.

When a plurality of copies of read image data is to be printed, the image data is similarly stored as output data page by page in HDD 108, fed from HDD 108 to RAM 106, and the data is transferred repeatedly by the number of copies to be output, to the image forming unit 122 timed with image formation.

(Printer Mode)

When image forming apparatus 100 is used as a printer, image data received through NIC 110 is output from image forming unit 122 through RAM 106 or the like. By way of example, when a print is instructed from a terminal to image forming apparatus 100, NIC 110 receives image data from the terminal connected to network 190. The received image data is transferred as output image data page by page to RAM 106, and stored in HDD 108. Thereafter, the image data stored in HDD 108 is successively read and fed to RAM 106 at appropriate timing. Then, in the similar manner as in the copy mode described above, the image data is transferred to image forming unit 122 where image formation takes place.

(Scanner Mode)

When image forming apparatus 100 is used, for example, as a network scanner, image data of the document read at document reading unit 120 is transmitted from NIC 110 through network 190 to a computer or the like. Here again, the document is electronically read by CCD 95 provided at document reading unit 120. The read image data of the document is completed as output data on RAM 106, and stored in HDD 108. Then, the image data is again transmitted from HDD 108 to RAM 106 and, after communication with a destination designated through operation unit 130 is established, the image data is transmitted to the designated transmission destination through NIC 110.

(Facsimile Mode)

Image forming apparatus 100 can transmit/receive FAX to and from an external facsimile device through the FAX modem and telephone line. When image forming apparatus 100 is used as a facsimile machine, data received by FAX from a facsimile machine is formed as image data on RAM 106, and in the similar manner as described above, the data is stored in HDD 108 and printed by image forming unit 122. Further, image forming apparatus 100 can read image data from HDD 108, convert the data to a data format for FAX communication and transmit the converted data to an external facsimile machine through the FAX modem and telephone line.

In the following, the function of inserting insert-sheets in image forming apparatus 100 will be specifically described. Here, it is assumed that COPY key 144 is touched by the user, on the home screen image (see FIG. 3) displayed on touch-panel display 132.

Figure 5:
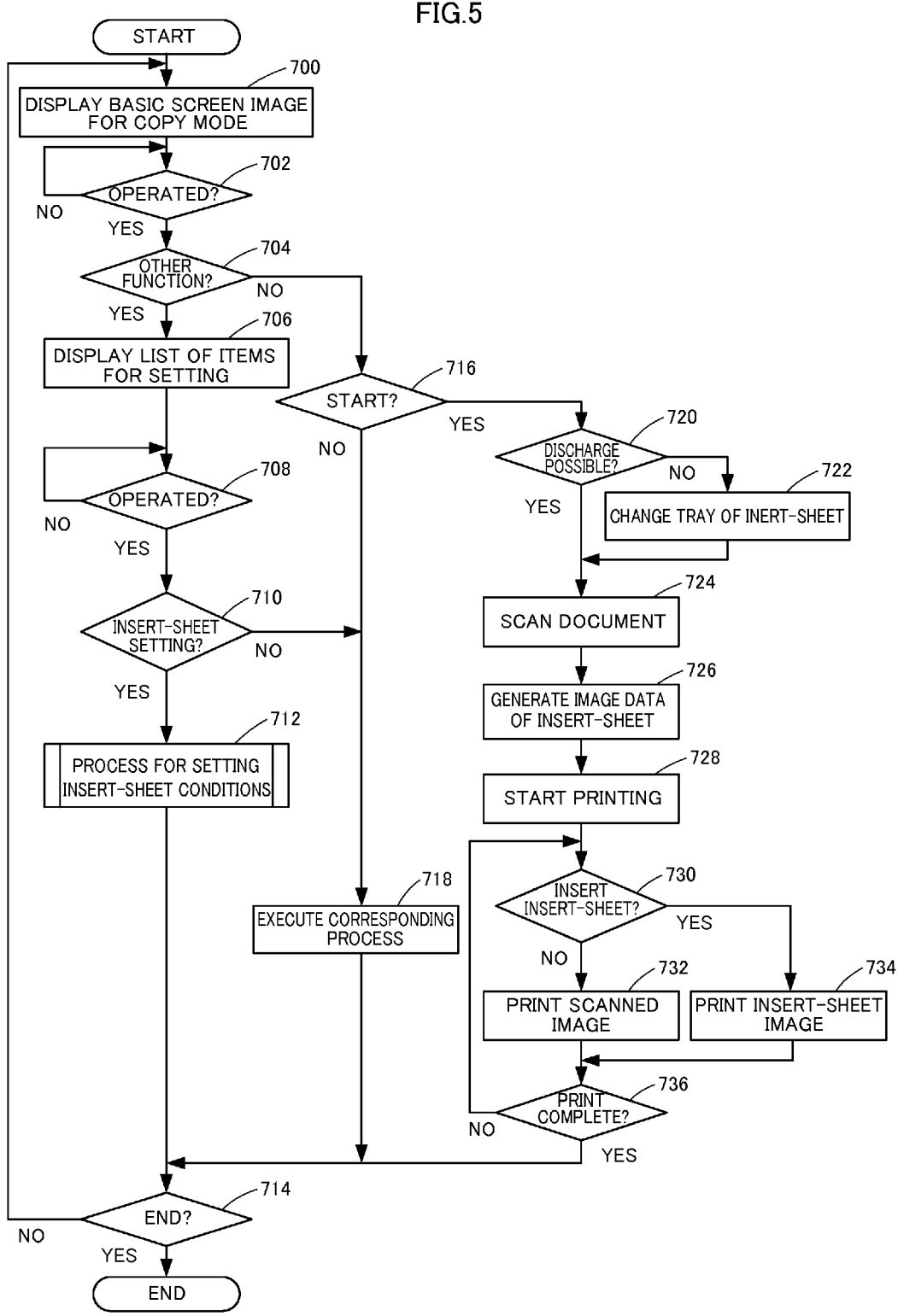
FIG. 5 is a flowchart representing a control structure of a program realizing the function of inserting an insert-sheet executed in the image forming apparatus in accordance with the embodiment of the present invention.

Referring to FIG. 5, at step 700 of a control structure of a program for realizing the function of inserting an insert-sheet executed by image forming apparatus 100, CPU 102 displays a basic screen image for the copy mode on touch-panel display 132. Specifically, CPU 102 reads prescribed graphic data from ROM 104 or HDD 108 and based thereon, generates image data of, for example, a screen image 200 shown in FIG. 6 on RAM 106. The generated image data is transferred to and displayed on touch-panel display 132.

Figure 6:
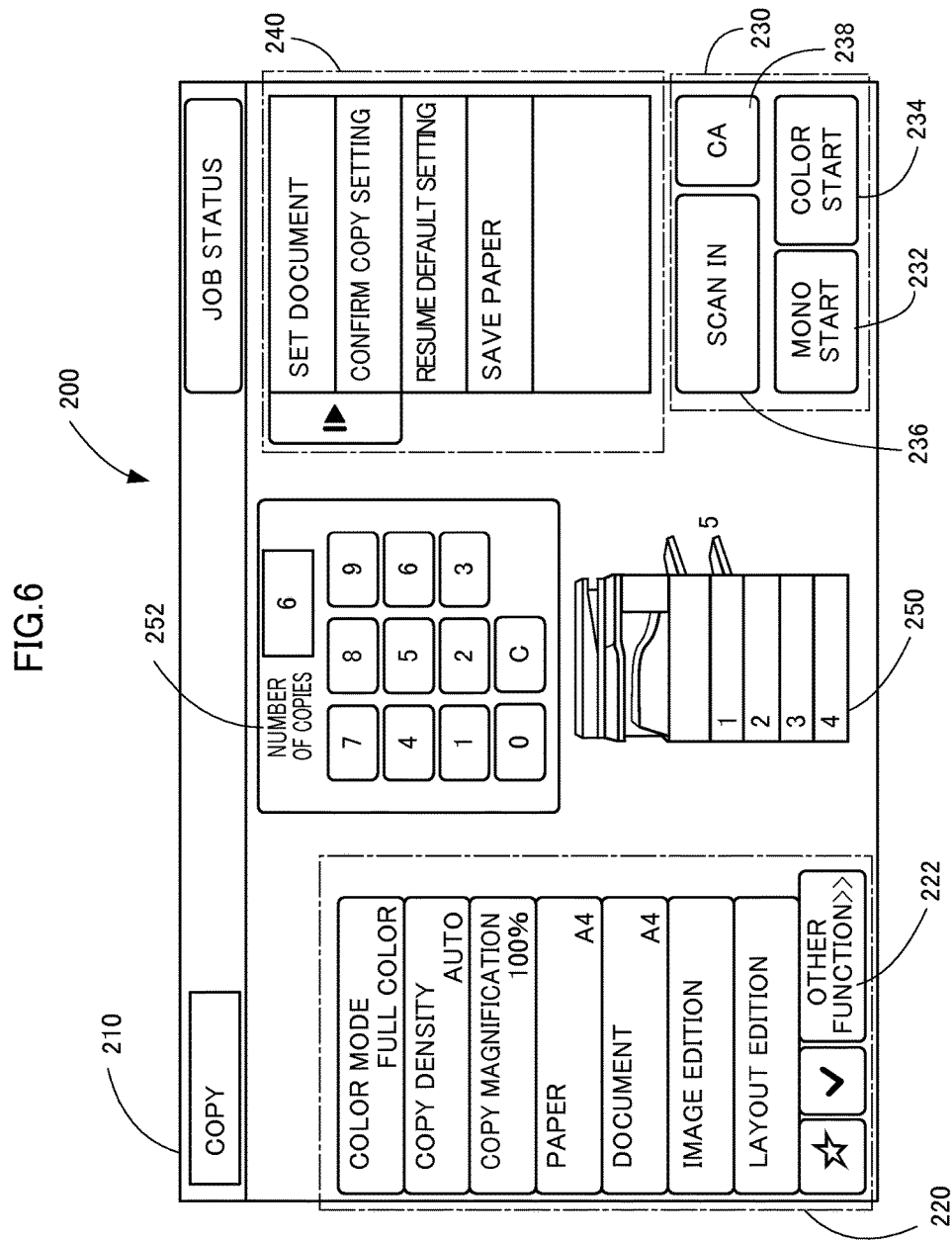
FIG. 6 shows a basic screen image of the copy mode displayed on the operation unit.

Referring to FIG. 6, on a system area 210 of screen image 200, characters "COPY" are displayed on the left corner to indicate the copy mode, and on the right corner, a key to display the job execution status is displayed. On a function setting area 220, keys for settings related to the copy function (keys for setting color mode, copy density, copy magnification and the like) are displayed. Some keys have indications of set contents. "OTHER FUNCTION" key 222 is a key for displaying keys allowing settings other than those set by the displayed keys. An area 252 including ten-keys is for setting number of copies for image formation. When keys "0" to "9" are touched, consecutively input numerals are displayed as the number of copies. When "C" key is touched, the input number of copies is cancelled (the number of copies is returned to "0"). In the example of FIG. 6, "6" is set as the number of copies. Below ten-key area 252, a schematic illustration of image forming apparatus 100 is displayed, and numbers "1" to "5" are allocated to distinguish paper feed trays. On an action panel area 240, information including help, advice and proposal related to the operation is displayed. By way of example, when a user selects a specific function, a function or functions related to the selected function are displayed. On a task trigger area 230, trigger keys operated by the user for actually operating image forming apparatus 100 after the setting is complete are displayed. In the present embodiment, on task trigger area 230, a MONO START key 232 for starting monochrome copying of a document, a COLOR START key 234 for starting color copying, a SCAN-IN key 236 for starting a process of once scanning a document and saving it as an image in image forming apparatus 100, and a clear all (CA) key 238 for clearing all settings are displayed.

At step 702, CPU 102 determines whether any of the keys is operated on the displayed basic screen image 200 of FIG. 6. If it is determined that any key is operated, the control proceeds to step 704. Otherwise, step 702 is repeated.

At step 704, CPU 102 determines whether or not the key determined to be operated at step 702 is OTHER FUNCTION key 222. If it is determined to be OTHER FUNCTION key 222, the control proceeds to step 706. Otherwise, the control proceeds to step 716.

At step 716, CPU 102 determines whether or not the key determined to be operated at step 702 is the start key (MONO START key 232 or COLOR START key 234). If it is determined to be the start key, the control proceeds to step 720, and the copy process is executed, as will be described later. Otherwise, the control proceeds to step 718, and at step 718, CPU 102 executes the process corresponding to the operated key. If the user has touched the color mode key, copy density key or the like in function setting area 220, step 718 is executed to enable settings related to the copy function.

At step 706, CPU 102 displays items that can be set, on touch-panel display 132. The displayed items also serve as keys for displaying the screen images allowing setting of the corresponding items. The displayed items include an item for setting conditions of insert-sheets (hereinafter also referred to as "insert-sheet setting").

At step 708, CPU 102 determines, in the state in which items allowing settings are displayed, if any of the items is operated (any of the items is touched). If any of the items is determined to be operated (touched), the control proceeds to step 710. Otherwise, step 708 is repeated At step 710, CPU 102 determines whether or not the key determined to be operated at step 702 is the insert-sheet setting key. If it is determined to be the insert-sheet setting key, the control proceeds to step 712. Otherwise, the control proceeds to step 718.

At step 718, CPU 102 executes a process corresponding to the operated key. Thereafter, the control proceeds to step 714.

At step 714, CPU 102 determines whether or not an end instruction has been given, and if not, the control returns to step 700. The instruction to end is, for example, pressing of power key 138. If it is determined that an end instruction is received, the present program ends. Otherwise, the control returns to step 700.

At step 712, CPU 102 executes the process for setting conditions of the insert-sheet. Specifically, step 712 includes the process of steps 750 to 776 shown in FIG. 7.

At step 750, CPU 102 displays a screen image allowing settings of the insert-sheet, on touch-panel display 132. Specifically, in the similar manner as at step 700, CPU 102 reads prescribed graphic data and based thereon, generates, for example, image data of screen image 300 shown in FIG.

Figure 8:
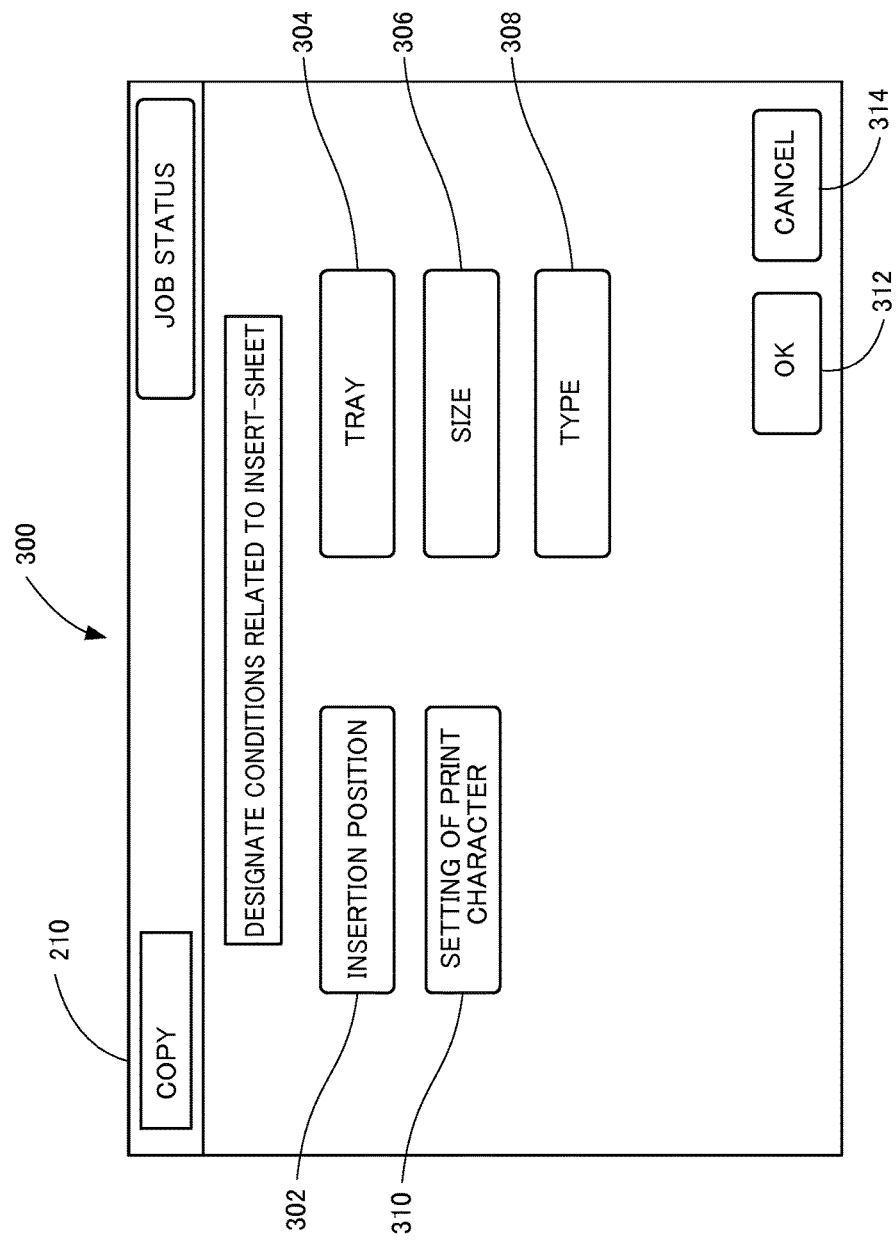
FIG. 8 shows an example of a screen image allowing setting of conditions of the insert-sheet.

8. The generated image data is transferred to and displayed on touch-panel display 132. In FIG. 8, system area 210 is displayed at the uppermost portion, and a plurality of keys 302 to 314 are displayed.

At step 752, CPU 102 determines, in the state in which screen image 300 of FIG. 8 is displayed, if any of the keys is operated. If it is determined that one of the keys is operated, the control proceeds to step 754. Otherwise, step 752 is repeated.

At step 754, CPU 102 determines whether or not the key determined to be operated at step 752 is an insertion position key 302. If it is determined to be insertion position key 302, the control proceeds to step 756, and a process for setting an insertion position is executed. Thereafter, the control returns to step 750. Otherwise, the control proceeds to step 758.

At step 758, CPU 102 determines whether or not the key determined to be operated at step 752 is a tray key 304. If it is determined to be tray key 304, the control proceeds to step 760, and a process for setting a tray is executed. Thereafter, the control returns to step 750. Otherwise, the control proceeds to step 762.

At step 762, CPU 102 determines whether or not the key determined to be operated at step 752 is a size key 306. If it is determined to be size key 306, the control proceeds to step 764, and a process for setting the size is executed. Thereafter, the control returns to step 750. Otherwise, the control proceeds to step 766.

At step 766, CPU 102 determines whether or not the key determined to be operated at step 752 is a type key 308. If it is determined to be type key 308, the control proceeds to step 768, and a process for setting the type is executed. Thereafter, the control returns to step 750. Otherwise, the control proceeds to step 770.

At step 770, CPU 102 determines whether or not the key determined to be operated at step 752 is a print character setting key 310. If it is determined to be print character setting key 310, the control proceeds to step 772, and a process for setting a print character is executed. Thereafter, the control returns to step 750. Otherwise, the control proceeds to step 774.

At step 774, CPU 102 determines whether or not the key determined to be operated at step 752 is an OK key 312. If it is determined to be OK key 312, the control proceeds to step 776. At step 776, CPU 102 finally decides the set conditions. Thereafter the control proceeds to step 714 (see FIG. 5). Otherwise, or if the key determined to be operated at step 752 is a CANCEL key 314, CPU 102 cancels the set conditions, and the control proceeds to step 714.

In this manner, the user can set conditions for the insert-sheet by touching keys 302 to 310 displayed on screen image 300. In the following, setting of each condition will be specifically described.

Figure 9:
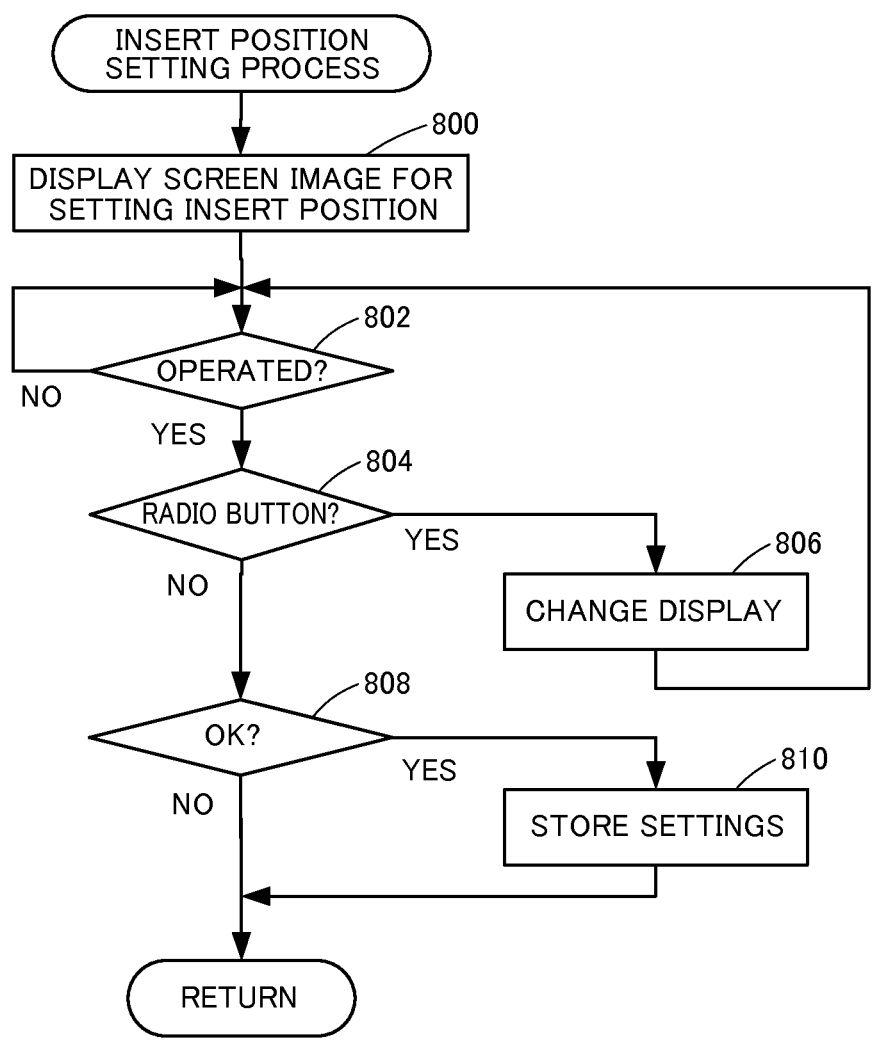
FIG. 9 is a flowchart representing a control structure of a program for setting the position for inserting the insert-sheet.

The process for setting the insertion position of step 756 specifically includes steps 800 to 810 shown in FIG. 9. At step 800, CPU 102 displays a screen image for setting the position for inserting the insert-sheet, on touch-panel display 132. Specifically, as at step 700, CPU 102 reads prescribed graphic data and based thereon, generates image data of, for example, a screen image 320 shown in FIG. 10. The generated image data is transferred to and displayed on touch-panel display 132.

Figure 10:
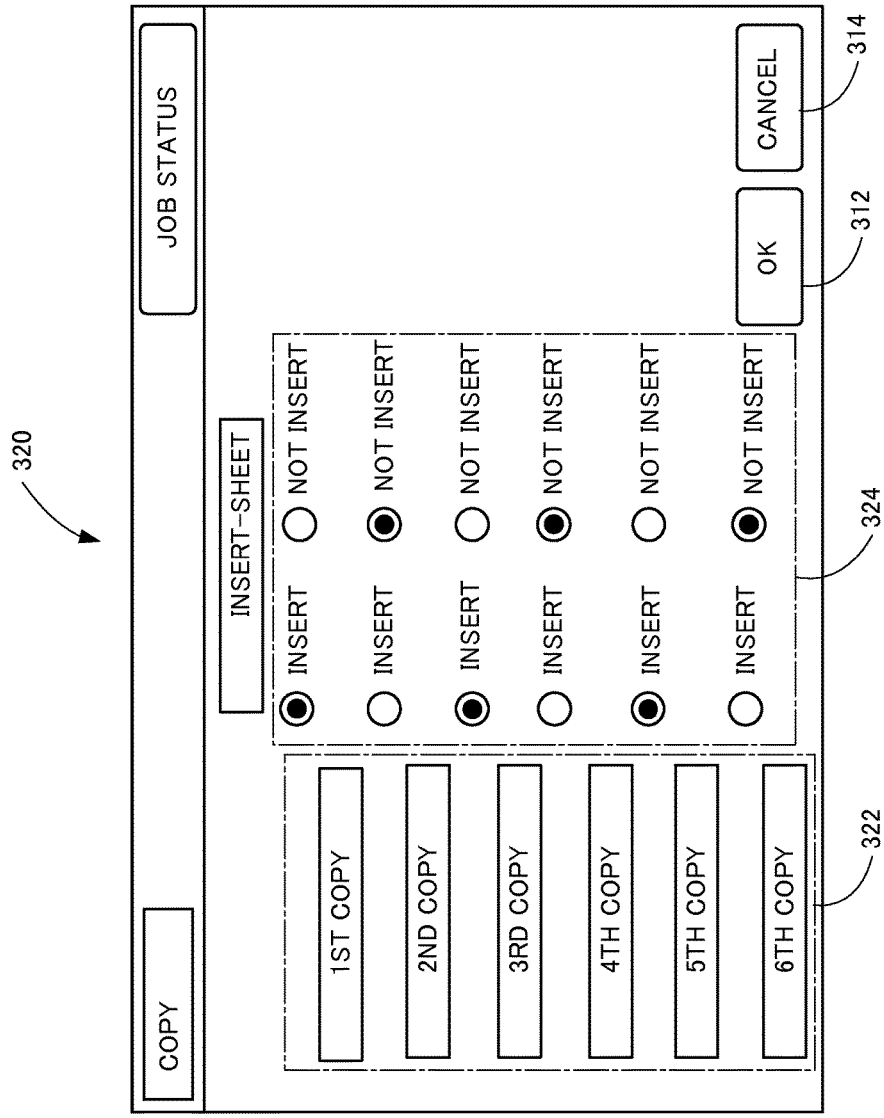
FIG. 10 shows an example of a screen image for setting the position for inserting the insert-sheet.

In FIG. 10, system area 210 is displayed at the uppermost portion, and characters indicating respective ones of set copies are displayed in an area 322. Here, "6" is set as the number of copies as shown in FIG. 6 and hence, "1ST COPY" to "6TH COPY" are displayed. On an area 324, characters each indicating whether an insert-sheet is to be inserted or not and radio buttons are displayed. These characters and radio buttons are arranged, along the direction of arrangement (vertical direction of screen image 320) of characters representing respective sets of copies, between the characters representing the respective sets of copies. When selected, the central portion of the radio button is turned black. In the initial state when screen image 320 is first displayed, all radio buttons corresponding to "not insert" are selected.

At step 802, CPU 102 determines, in the state in which screen image 320 shown in FIG. 10 is displayed, if any of the keys is operated. If it is determined to be operated, the control proceeds to step 804. Otherwise, step 802 is repeated.

At step 804, CPU 102 determines whether or not the operation at step 802 is a touch to any of the radio buttons. If it is determined to be a touch to any of the radio buttons, the control proceeds to step 806. Otherwise, the control proceeds to step 808.

At step 806, CPU 102 sets the display of the touched radio button to the selected state and, at the same time, sets the display of the other radio button on the same row as the touched radio button to the non-selected state. Thereafter, the control returns to step 802.

Figure 7:
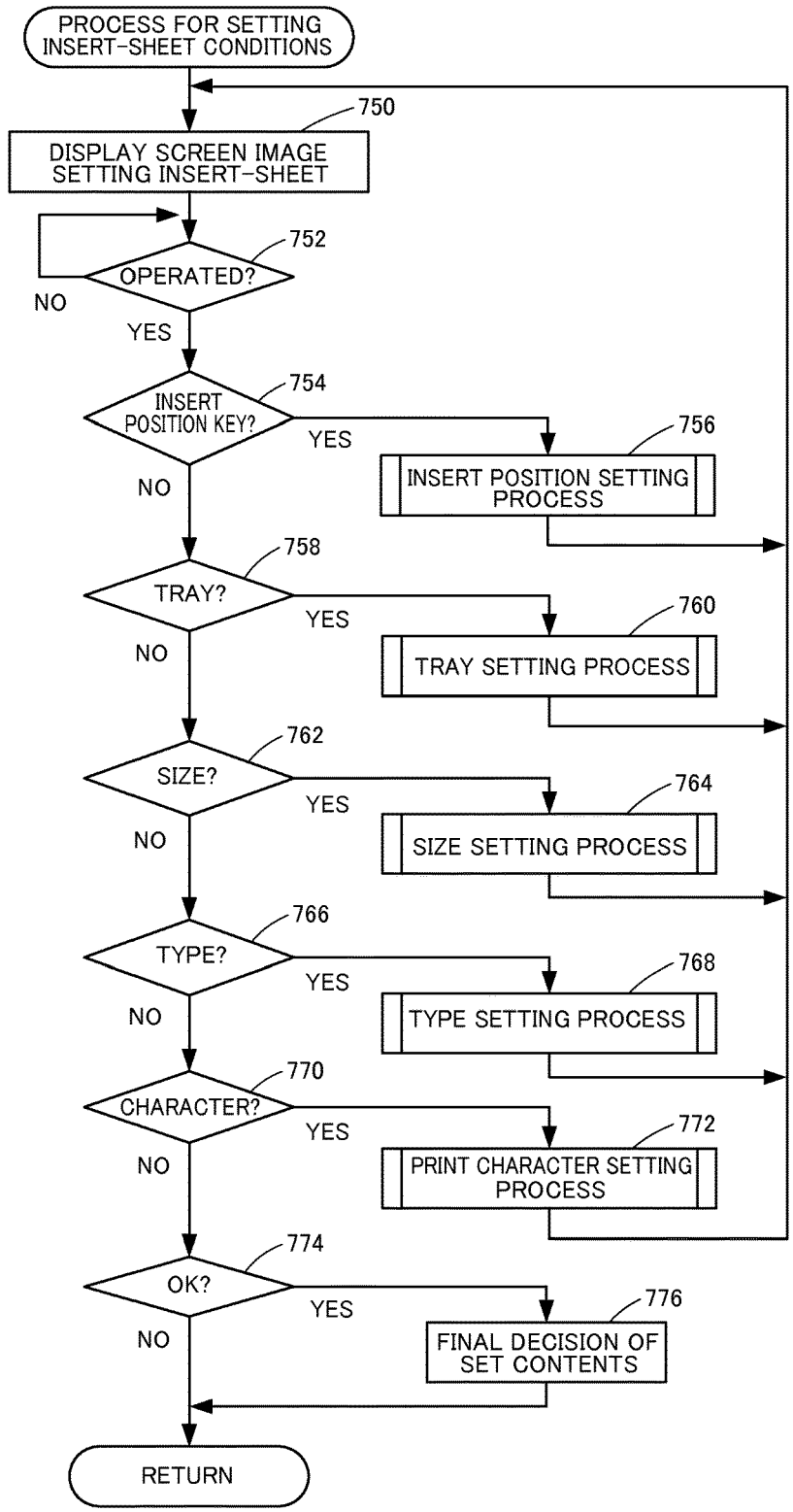
FIG. 7 is a flowchart representing a control structure of a program for setting conditions of the insert-sheet.

At step 808, CPU 102 determines whether the key determined to be operated at step 802 is OK key 312. If it is determined to be OK key 312, the control proceeds to step 810. At step 810, CPU 102 determines the set insertion position as tentative decision and stores information specifying the tentative decision in a prescribed area of, for example, RAM 106. Thereafter, the control proceeds to step 750 (FIG. 7). Otherwise, or if the key determined to be operated at step 802 is CANCEL key 314, CPU 102 cancels the set conditions and the control proceeds to step 750.

Figure 11:
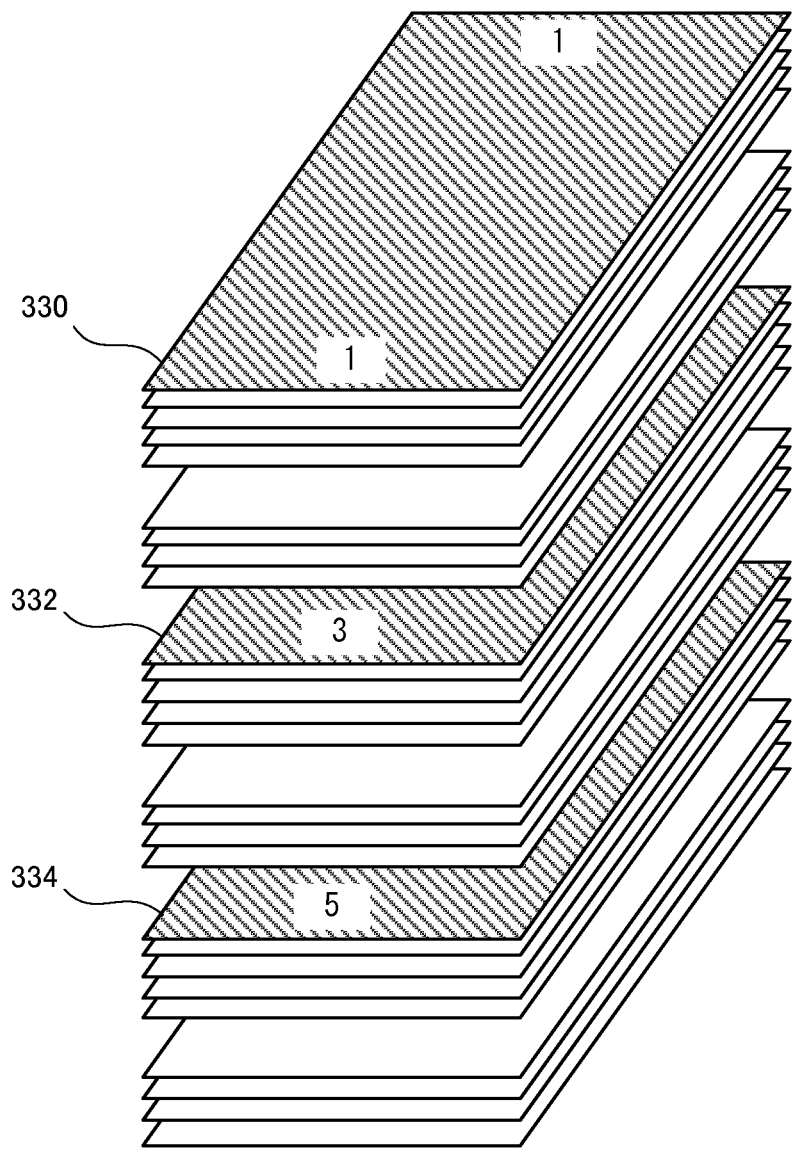
FIG. 11 is a perspective view showing insert-sheets inserted to copies.

By the above-described steps 800 to 810, whether or not an insert-sheet is to be inserted between each set of copies is determined. For example, with the radio buttons set in the manner shown in FIG. 10, three insert-sheets 330 to 334 are inserted on the first set, third set and fifth set of copies, as shown in FIG. 11.

Figure 12:
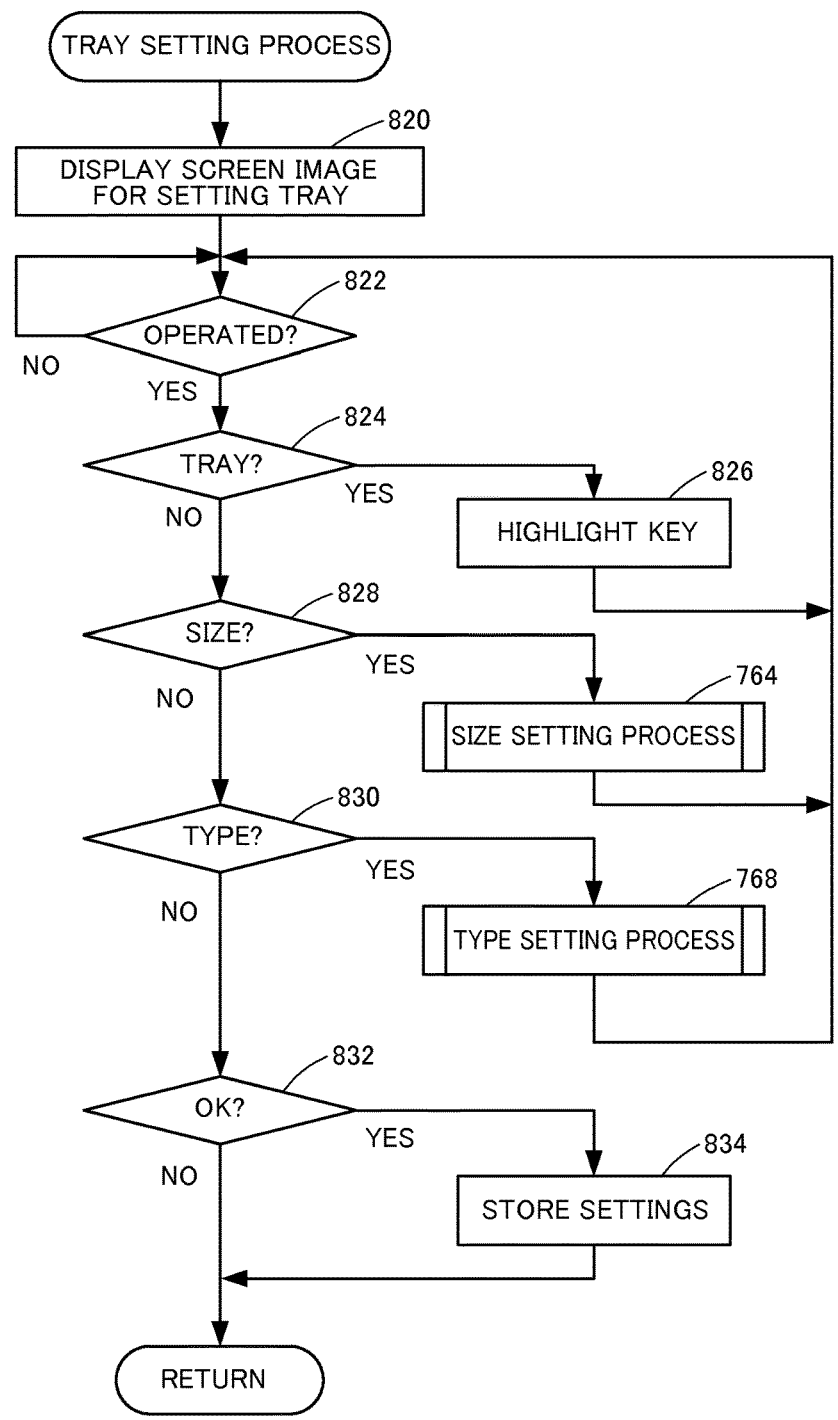
FIG. 12 is a flowchart representing a control structure of a program for setting a paper feed tray containing insert-sheets.

The tray setting process of step 760 shown in FIG. 7 specifically includes the process of steps 820 to 834 and steps 764 and 768 shown in FIG. 12. At step 820, CPU 102 displays a screen image for setting a tray containing the insert-sheets, on touch-panel display 132. Specifically, as at step 700, CPU 102 reads prescribed graphic data and based thereon, generates image data of, for example, a screen image 340 shown in FIG. 13. The generated image data is transferred to and displayed on touch-panel display 132.

Figure 13:
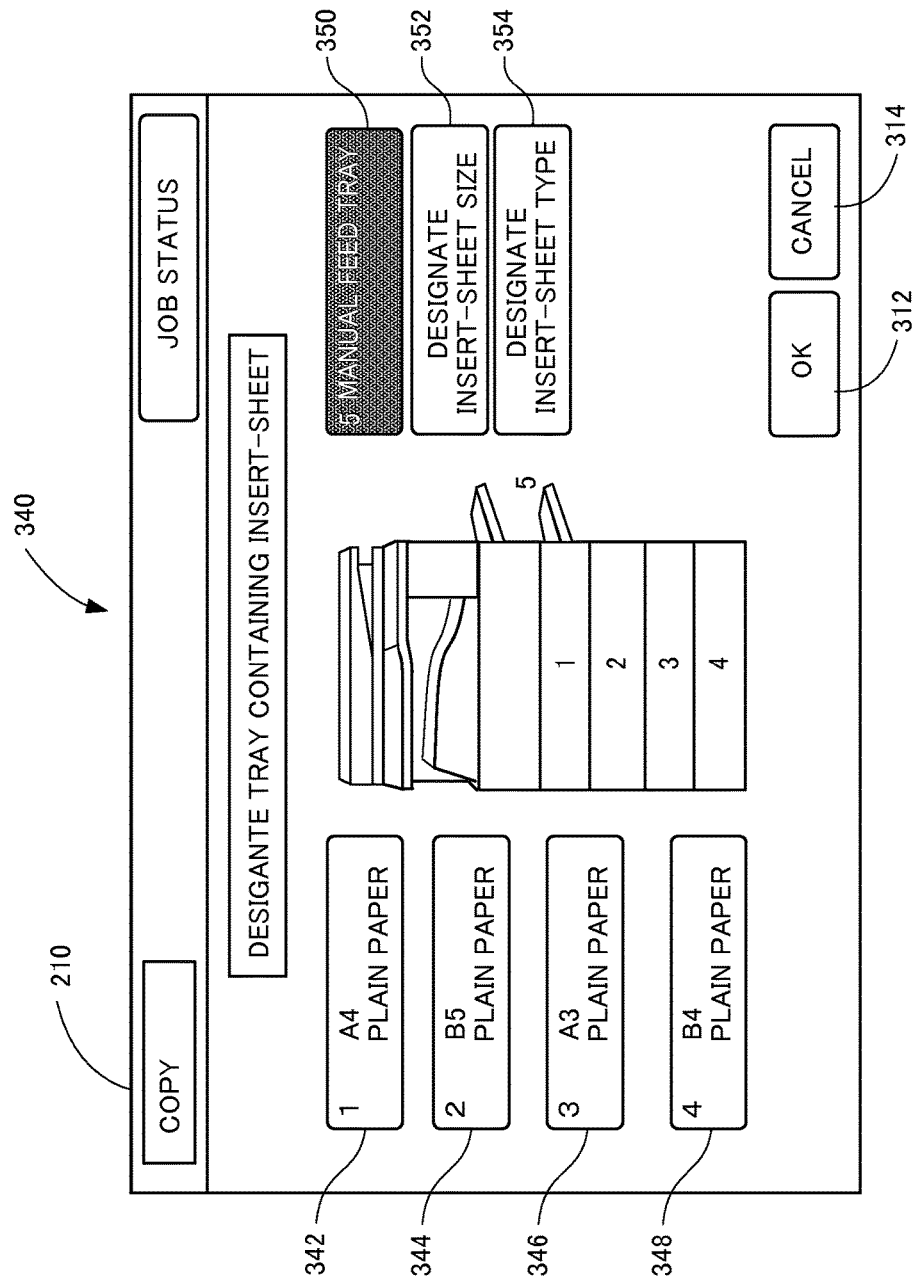
FIG. 13 shows an example of a screen image for setting the paper feed tray.

Referring to FIG. 13, at the uppermost portion, system area 210 is displayed and a plurality of keys 342 to 354 are displayed. In a schematic illustration of image forming apparatus displayed at the center of screen image 340, numerals "1" to "5" are indicated corresponding to paper feed trays 81 to 85. The numerals "1" to "5" on keys 342 to 350 corresponds to the numerals displayed on the illustration of image forming apparatus, or paper feed trays 81 to 85. On keys 342 to 348, information related to the recording paper contained in the corresponding paper feed trays 81 to 84 is displayed. OK key 312 and CANCEL key 314 have the same functions as those of FIG. 10.

At step 822, CPU 102 determines whether any of the keys is operated while screen image 340 shown in FIG. 13 is displayed. If it is determined that any of the keys is operated, the control proceeds to step 824. Otherwise, step 822 is repeated.

At step 824, CPU 102 determines whether the key determined to be operated at step 822 is any of the keys 342 to 350 designating paper feed trays 81 to 85. If it is determined that any of the keys 342 to 350 is touched, the control proceeds to step 826. Otherwise, the control proceeds to step 828.

At step 826, CPU 102 highlights the touched key to indicate that the touched key is selected. Thereafter, the control returns to step 822. FIG. 13 shows a state in which manual feed tray key 350 is touched and selected.

At step 828, CPU 102 determines whether the key determined to be operated at step 822 is a key 352 for setting the size of the insert-sheet. If it is determined to be the key 352 for setting the size of the insert-sheet, the control proceeds to step 764, at which the process for setting the size, as will be described later, is executed. Thereafter, the control returns to step 822. Otherwise, the control proceeds to step 830.

At step 830, CPU 102 determines whether the key determined to be operated at step 822 is a key 354 for setting the type of the insert-sheet. If it is determined to be the key 354 for setting the type of the insert-sheet, the control proceeds to step 768, at which the process for setting the type, which will be described later, is executed. Thereafter, the control returns to step 822. Otherwise, the control proceeds to step 832.

At step 832, CPU 102 determines whether the key determined to be operated at step 822 is OK key 312. If it is determined to be OK key 312, the control proceeds to step 834. At step 834, CPU 102 tentatively determines the set paper feed tray as tentative decision and stores information specifying the tentative decision in a prescribed area of, for example, RAM 106. Thereafter, the control proceeds to step 750 (FIG. 7). Otherwise, or if the key determined to be operated at step 822 is CANCEL key 314, CPU 102 cancels the set conditions and the control proceeds to step 750.

Through the above-described steps 820 to 832, 764 and 768, the paper feed tray containing the insert-sheet is set. For example, if the set state is as shown in FIG. 13, the sheets placed in manual paper feed tray 85 are used as the insert-sheets.

Figure 14:
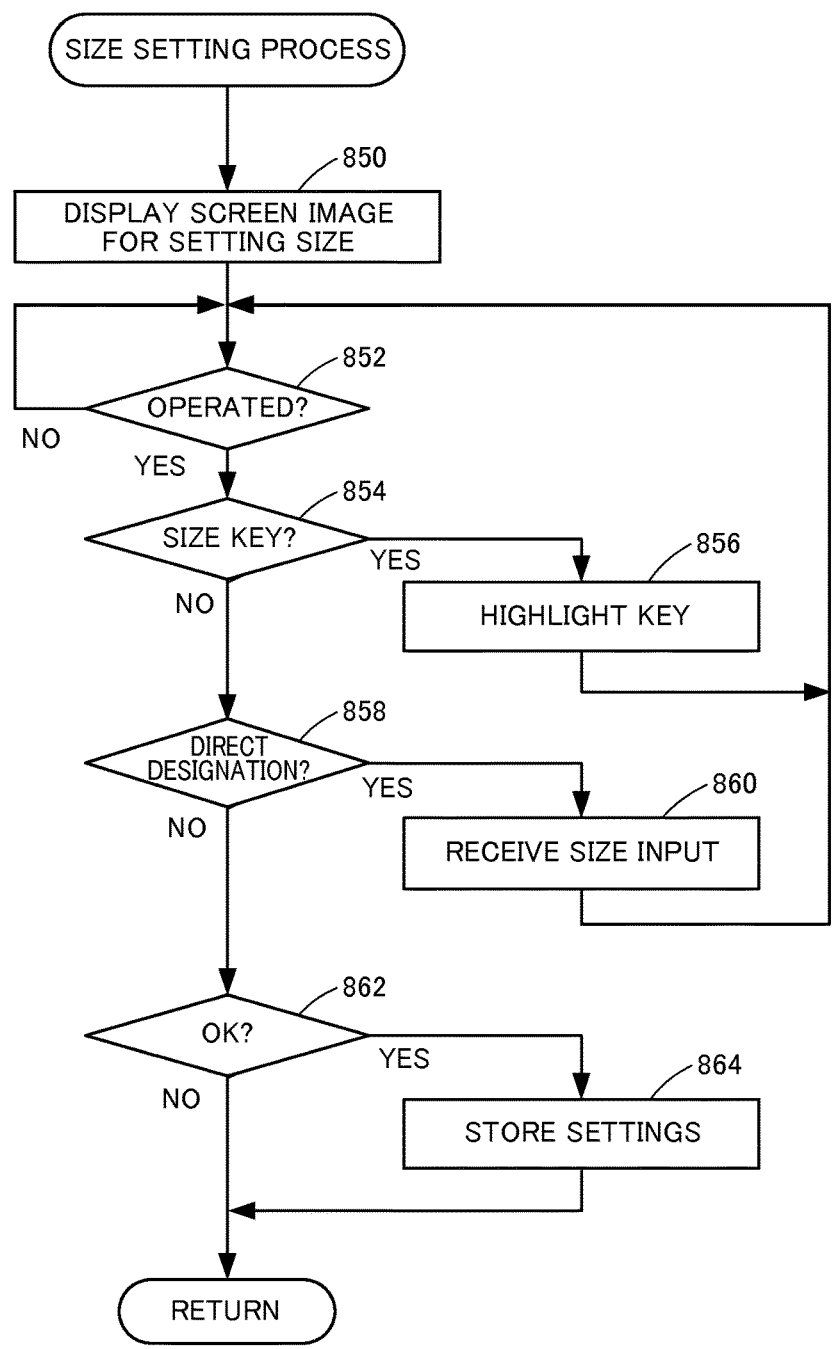
FIG. 14 is a flowchart representing a control structure of a program for setting the size of the insert-sheet.

The size setting process of step 764 of FIGS. 7 and 12 specifically corresponds to the process steps 850 to 864 shown in FIG. 14. At step 850, CPU 102 displays a screen image allowing setting of the size of the insert-sheet. Specifically, in the similar manner as at step 700, CPU 102 reads prescribed graphic data and based thereon, generates, for example, image data of screen image 360 shown in FIG. 15. The generated image data is transferred to and displayed on touch-panel display 132.

Figure 15:
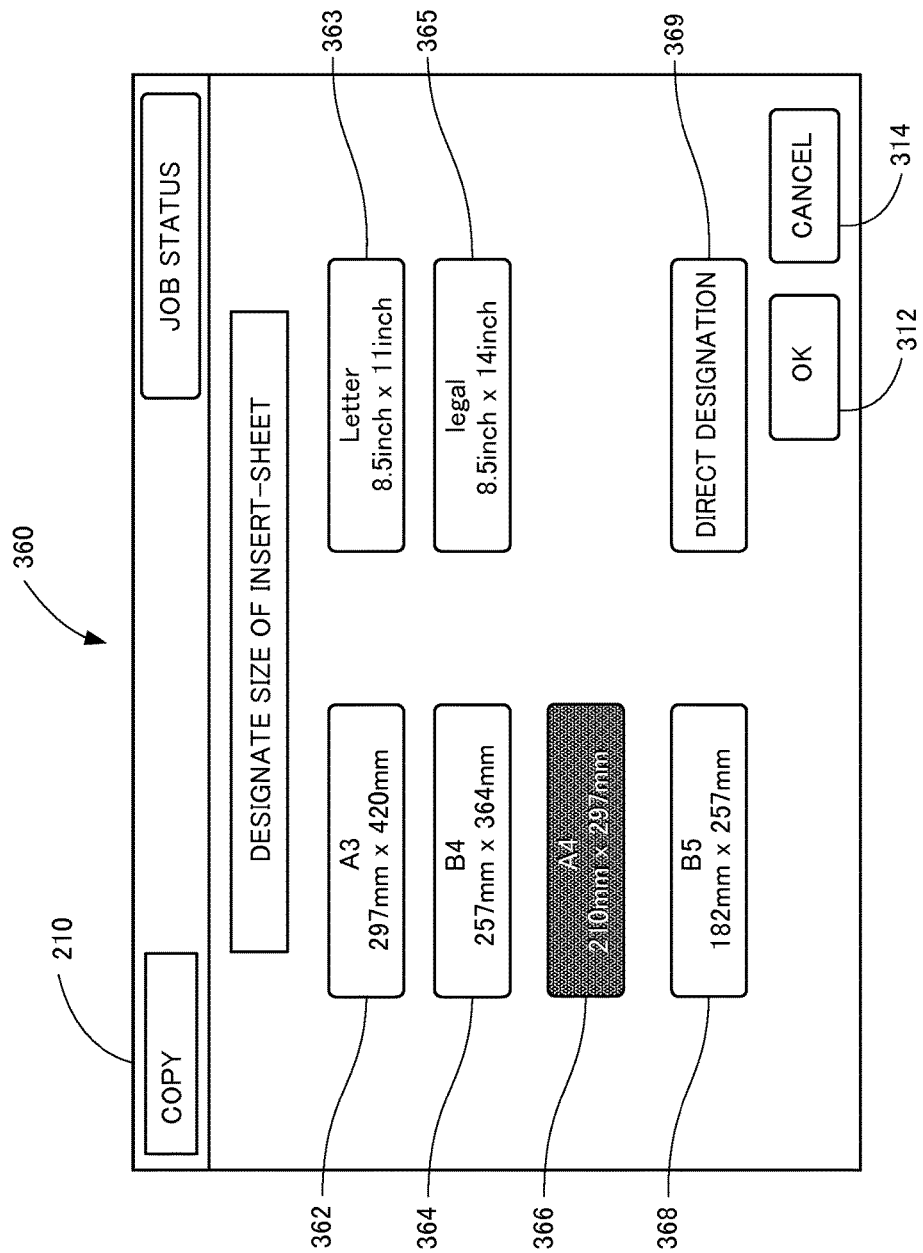
FIG. 15 shows an example of a screen image for setting the size of the insert-sheet.

Referring to FIG. 15, at the uppermost portion, system area 210 is displayed, and a plurality of keys 362 to 369 are displayed. On keys 362 to 368, pre-defined sizes of recording paper are displayed. OK key 312 and CANCEL key 314 have the same functions as those of FIG. 10.

At step 852, CPU 102 determines whether any of the keys is operated while screen image 360 shown in FIG. 15 is displayed. If it is determined that any of the keys is operated, the control proceeds to step 854. Otherwise, step 852 is repeated.

At step 854, CPU 102 determines whether the key determined to be operated at step 852 is any of the keys 362 to 368. If it is determined that any of the keys 362 to 368 is touched, the control proceeds to step 856. Otherwise, the control proceeds to step 858.

At step 856, CPU 102 highlights the touched key to indicate that the touched key is selected. Thereafter, the control returns to step 852. FIG. 15 shows a state in which a key 366 designating A4 size is touched and selected.

At step 858, CPU 102 determines whether the key determined to be operated at step 852 is a key 369 for directly setting the size. If it is determined to be the key 369, the control proceeds to step 860. Otherwise, the control proceeds to step 862.

Figure 16:
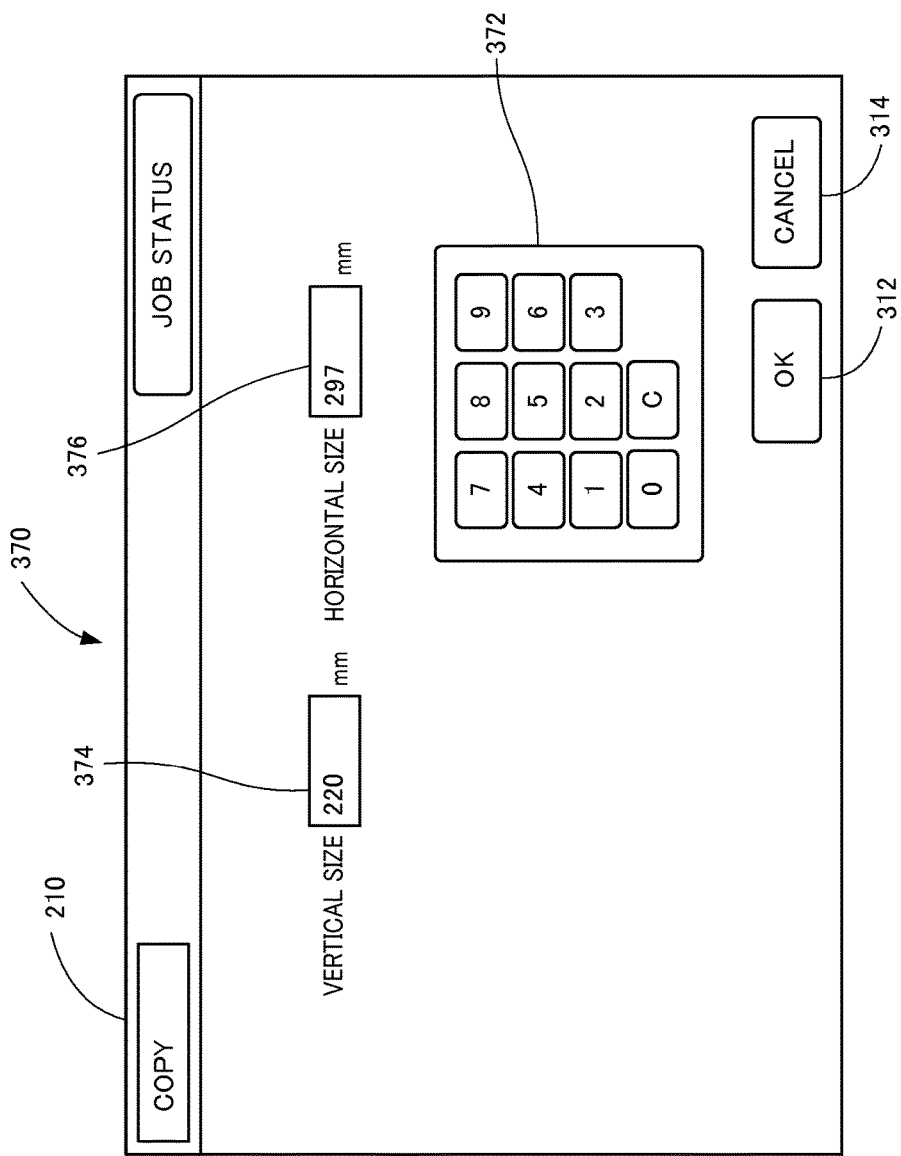
FIG. 16 shows an example of a screen image allowing direct input of the size of the insert-sheet.

At step 860, CPU 102 displays a screen image including ten-keys allowing direct input of vertical and horizontal dimensions of the insert-sheet, and stores the size input by the ten-key operations by the user in RAM 106. For example, a screen image 370 shown in FIG. 16 is displayed. The user can directly input the size of the insert-sheet using ten-keys 372. Then, the control returns to step 852.

At step 862, CPU 102 determines whether the key determined to be operated at step 852 is OK key 312. If it is determined to be OK key 312, the control proceeds to step 864. At step 864, CPU 102 tentatively determines the set size of recording paper as tentative decision and stores information specifying the tentative decision in a prescribed area of, for example, RAM 106. Thereafter, the control proceeds to step 750 (FIG. 7). Otherwise, or if the key determined to be operated at step 852 is CANCEL key 314, CPU 102 cancels the set conditions and the control proceeds to step 750.

Through the above-described steps 850 to 864, the size of the insert-sheet is set. For example, if the set state is as shown in FIG. 15, 210 mm×297 mm (A4 size) is set as the size of the insert-sheet.

Figure 17:
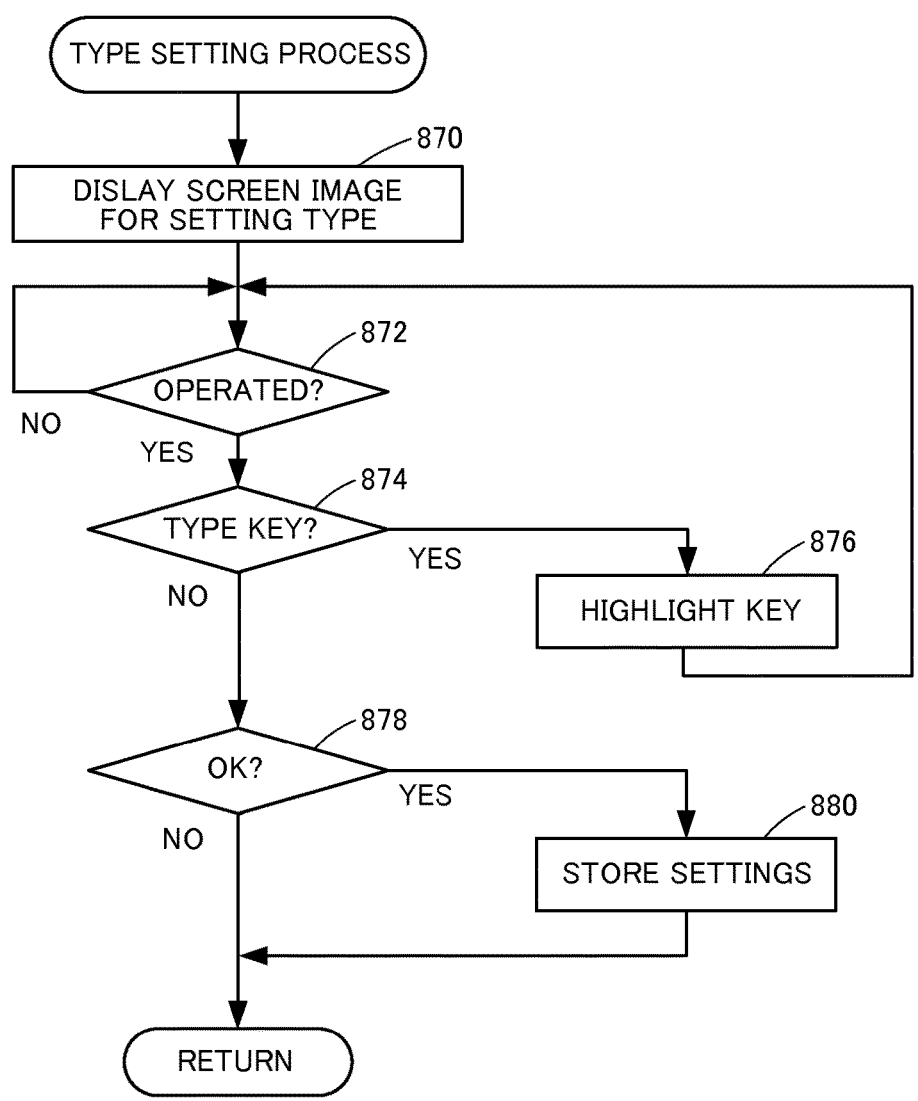
FIG. 17 is a flowchart representing a control structure of a program for setting the type of the insert-sheet.

The type setting process of step 768 of FIGS. 7 and 12 specifically corresponds to the process steps 870 to 880 shown in FIG. 17. At step 870, CPU 102 displays a screen image allowing setting of the type of the insert-sheet on touch-panel display 132. Specifically, in the similar manner as at step 700, CPU 102 reads prescribed graphic data and based thereon, generates, for example, image data of screen image 380 shown in FIG. 18. The generated image data is transferred to and displayed on touch-panel display 132.

Figure 18:
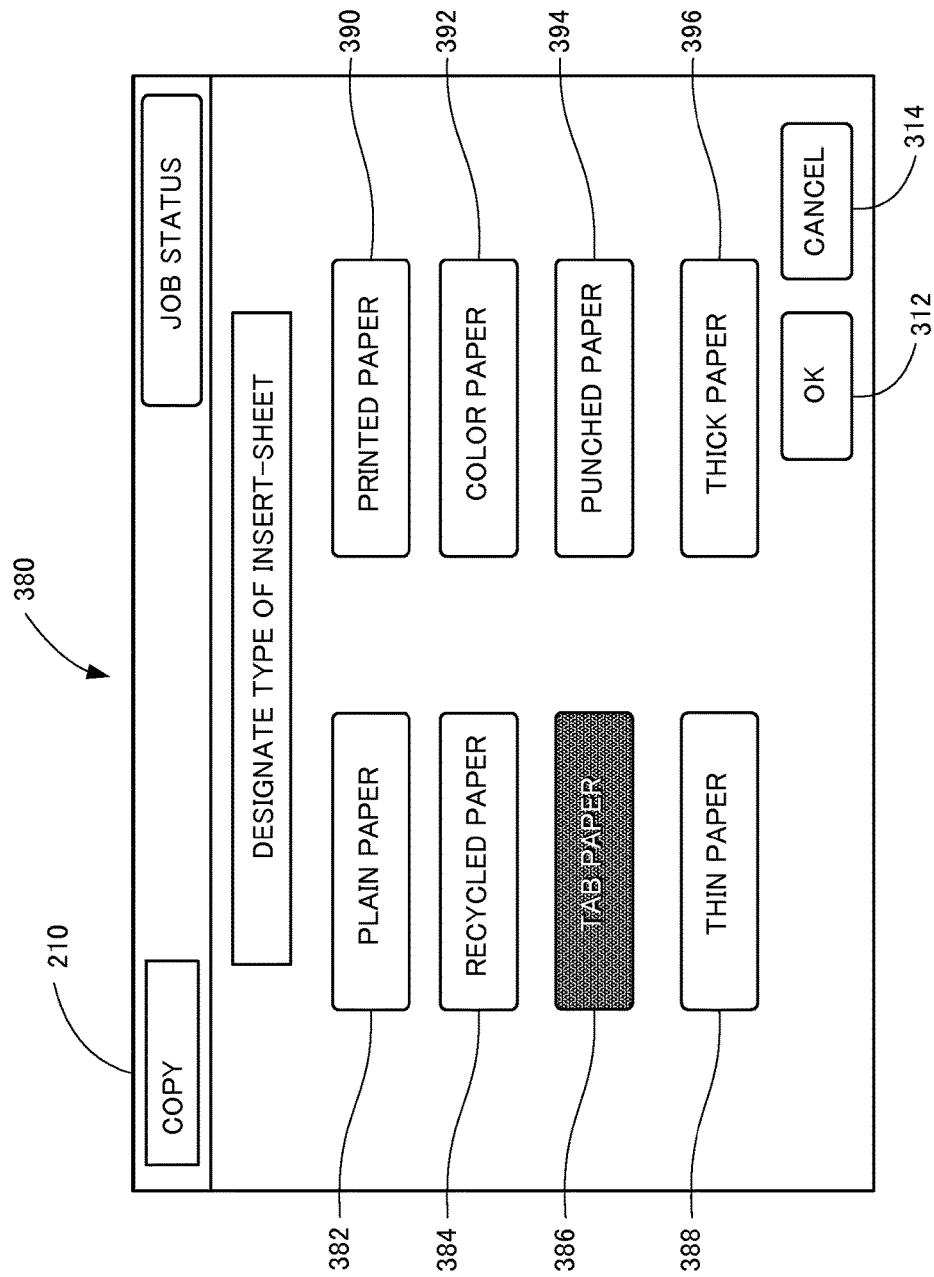
FIG. 18 shows an example of a screen image for setting the type of the insert-sheet.

Referring to FIG. 18, at the uppermost portion, system area 210 is displayed, and a plurality of keys 382 to 396 for designating the type of the insert-sheet are displayed. OK key 312 and CANCEL key 314 have the same functions as those of FIG. 10.

At step 872, CPU 102 determines whether any of the keys is operated while screen image 380 shown in FIG. 18 is displayed. If it is determined that any of the keys is operated, the control proceeds to step 874. Otherwise, step 872 is repeated.

At step 874, CPU 102 determines whether the key determined to be operated at step 872 is any of the keys 382 to 396 indicating pre-defined types of sheets. If it is determined that any of the keys 382 to 396 is touched, the control proceeds to step 876. Otherwise, the control proceeds to step 878.

At step 876, CPU 102 highlights the touched key to indicate that the touched key is selected. Thereafter, the control returns to step 872. In FIG. 18, a tab paper key 386 is selected.

At step 878, CPU 102 determines whether the key determined to be operated at step 872 is OK key 312. If it is determined to be OK key 312, the control proceeds to step 880. At step 880, CPU 102 tentatively determines the set type of the insert-sheet as tentative decision and stores information specifying the tentative decision in a prescribed area of, for example, RAM 106. Thereafter, the control proceeds to step 750 (FIG. 7). Otherwise, or if the key determined to be operated at step 822 is CANCEL key 314, CPU 102 cancels the set conditions and the control proceeds to step 750.

Through the above-described steps 870 to 880, the type of the insert-sheet is set. For example, if the set state is as shown in FIG. 18, the tab paper is set as the type of the insert-sheet.

Figure 19:
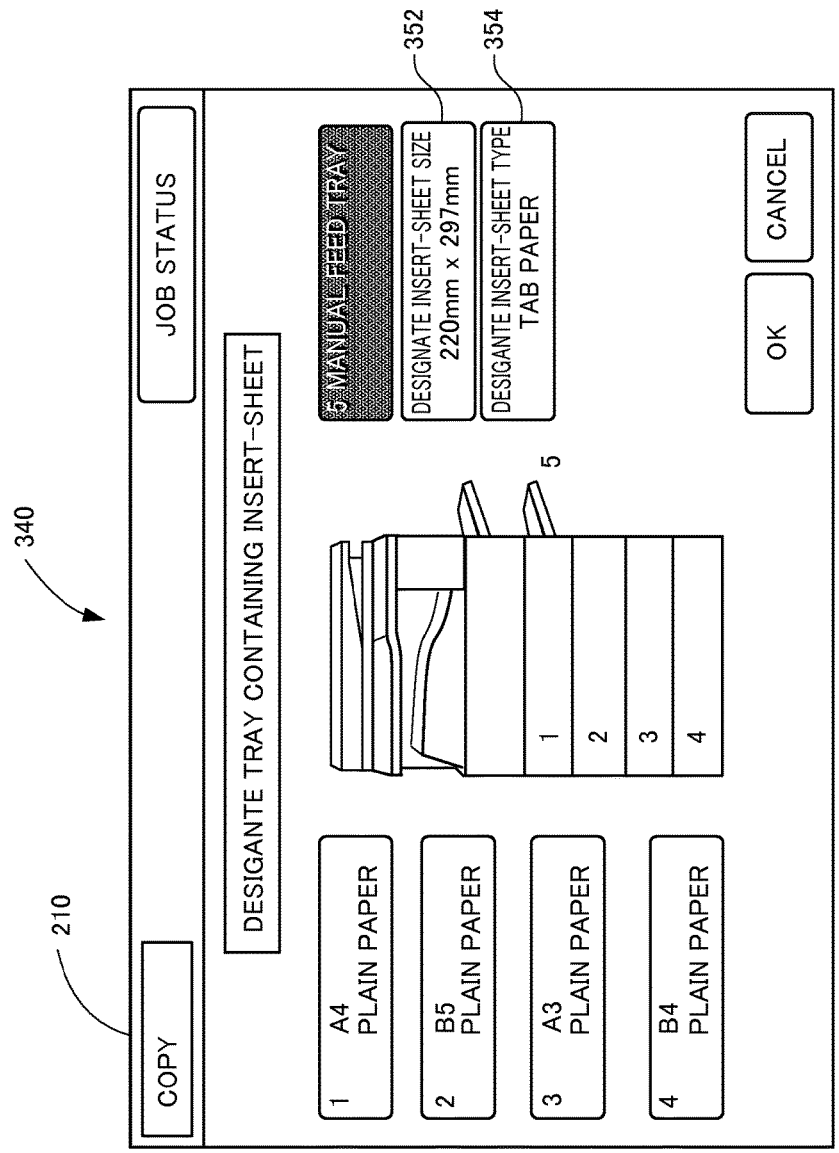
FIG. 19 shows an example of a screen image in which the size and type of the insert-sheet are set.

The screen image 340 shown in FIG. 19 is displayed when conditions related to the insert-sheet are set as shown in FIGS. 15 and 18 through step 760 (tray setting process), step 764 (size setting process) and step 768 (type setting process), and thereafter step 750 (see FIG. 7) is executed. On key 352, it is indicated that the set size of the insert-sheet is 220 mm×297 mm. On key 354, it is indicated that the set type of the insert-sheet is the tab paper.

Figure 20:
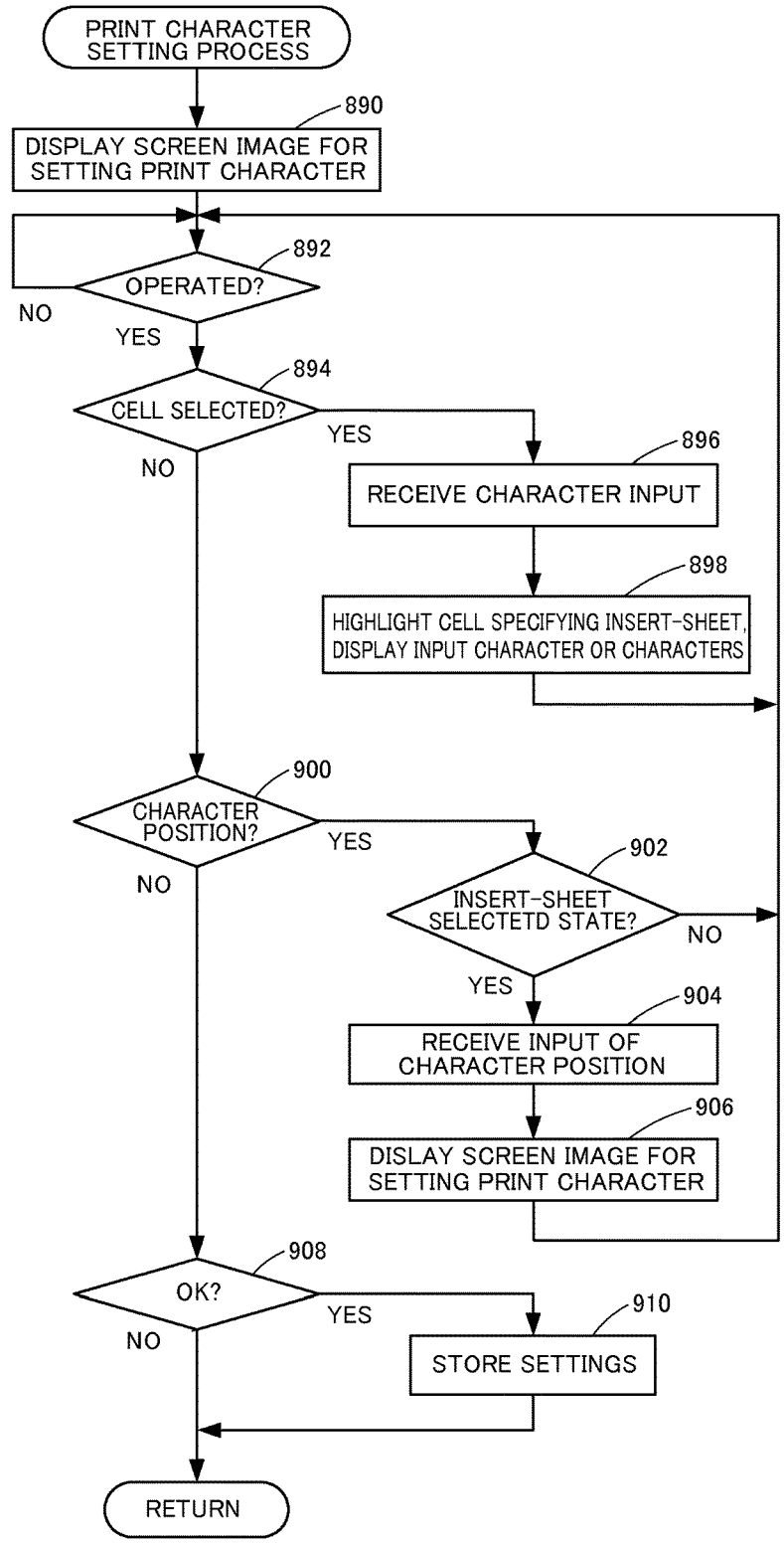
FIG. 20 is a flowchart representing a control structure of a program for setting conditions related to characters to be printed on insert-sheets.

The process for setting print character at step 772 of FIG. 7 specifically corresponds to process steps 890 to 910 shown in FIG. 20. At step 890, CPU 102 displays a screen image for setting the character or characters to be printed on the insert-sheet, on touch-panel display 132. Specifically, in the similar manner as at step 700, CPU 102 reads prescribed graphic data and based thereon, generates, for example, image data of screen image 400 shown in FIG. 21. The generated image data is transferred to and displayed on touch-panel display 132.

Figure 21:
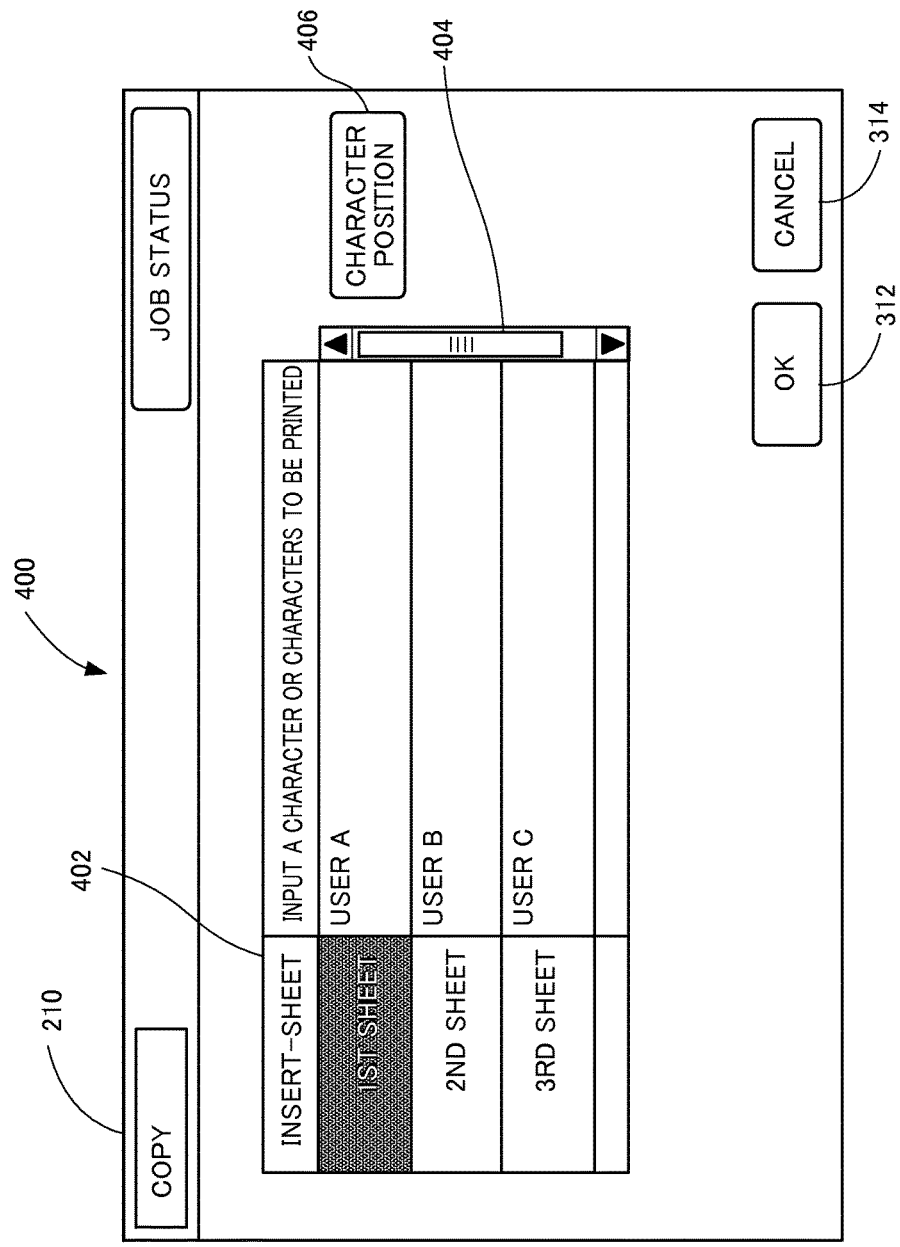
FIG. 21 shows an example of a screen image for setting characters to be printed on insert sheets.

Referring to FIG. 21, at the uppermost portion, system area 210 is displayed. In a table area 402, character information designating insert-sheets is displayed in cells on the left end column (hereinafter referred to as "insert-sheet designating cells"), and characters to be printed on the corresponding insert-sheets are displayed in cells (hereinafter referred to as "character display cells") on the right side of insert-sheet designating cells. Here, it is set to insert three insert-sheets as shown in FIG. 10. Therefore, characters "1ST SHEET" to "3RD SHEET" are displayed in the insert-sheet designating cells. If the number of insert-sheets is large, the insert-sheet designating cells and character display cells not appearing on the screen can be displayed by scrolling the display of table area 402, using a scroll bar 404 on the right side of table area 402.

At step 892, CPU 102 determines whether any of the plurality of keys and the cells is operated while screen image 400 shown in FIG. 21 is displayed. If it is determined that any of the keys and cells is operated (touched), the control proceeds to step 894. Otherwise, step 892 is repeated.

At step 894, CPU 102 determines whether any of the insert-sheet designating cells and the character display cells is operated. If it is determined that any of the insert-sheet designating cells and the character display cells is operated (touched), the control proceeds to step 896. Otherwise, the control proceeds to step 900.

At step 896, CPU 102 displays the character input screen image. On the character input screen image, character input keys (alphanumeric keys and ten keys) and function keys (including kanji-character conversion key) similar to those on a keyboard for computers are displayed, and characters (and numerals) can be input through touch operations by the user.

When input of characters is completed (for example, when OK key displayed on the character input screen image is touched), at step 898, CPU 102 highlights the cell determined to be touched at step 892 (if a character display cell is touched, the insert-sheet designating cell on the left side of the touched cell) and displays the character or characters input at step 896 in the character display cell on the right side. If any insert-sheet designating cell has been highlighted, that insert-sheet designating cell is returned to the normal manner of display. Thereafter, the control returns to step 892.

At step 900, CPU 102 determines whether or not the one determined to be operated at step 892 is character position key 406. If character position key 406 is determined to be touched, the control proceeds to step 902. Otherwise, the control proceeds to step 908.

At step 902, CPU 102 determines whether or not any insert-sheet is in the selected state. Specifically, CPU 102 determines whether any insert-sheet designating cell is highlighted or not. If any insert-sheet is determined to be in the selected state, the control proceeds to step 904. Otherwise, the control returns to step 892. Specifically, if none of the insert-sheets is selected, the display on the image screen is unchanged even if character position key 406 is touched. If any of the insert-sheets is in the selected state, the control proceeds to step 904 even if nothing is displayed on the character display cell. The reason for this is that when no character is input, a numeral indicating the number of set of copies is printed on the insert-sheet and, hence, the step is executed to allow designation of the position of the numeral.

At step 904, CPU 102 displays a screen image for setting the position of the character or characters to be printed on the insert-sheet. The screen image for setting the character position is a screen image allowing input of XY coordinates of a rectangular area in which the character or characters are printed. For example, it is a screen image similar to that shown in FIG. 16, including ten-keys for entering two numerical values (X and Y coordinates). The input XY coordinates represent, for example, coordinates of the upper left vertex of a rectangular area in which the characters are printed, with the upper left vertex of the insert-sheet being the origin. It is preferred that a default character position is set in advance. Specifically, if a character or characters are displayed in the character displaying cell, it is preferred that the characters are printed at the default position when image formation is executed, even if character position key 406 is untouched. The default position, for example, may be at the central position along the upper and lower sides, spaced by a prescribed distance from the upper or lower side of the insert-sheet. The positional coordinates of the upper left vertex of the rectangular area in which the characters are printed can be determined based on the length of the input characters.

When input is completed (for example, when OK key displayed on the character position setting screen image is touched), at step 906, CPU 102 displays the screen image for setting the print characters when the character position key 406 was last touched. Specifically, the screen image for setting the print character having any of the insert-sheet designating cells highlighted is displayed. Thereafter, the control returns to step 892.

At step 908, CPU 102 determines whether the key determined to be operated at step 892 is OK key 312. If it is determined to be OK key 312, the control proceeds to step 910. At step 910, CPU 102 determines the set conditions related to print characters as tentative decision and stores information specifying the tentative decision in a prescribed area of, for example, RAM 106. Thereafter, the control proceeds to step 750 (FIG. 7). Otherwise, or if the key determined to be operated at step 892 is CANCEL key 314, CPU 102 cancels the set conditions and the control proceeds to step 750.

Figure 22:
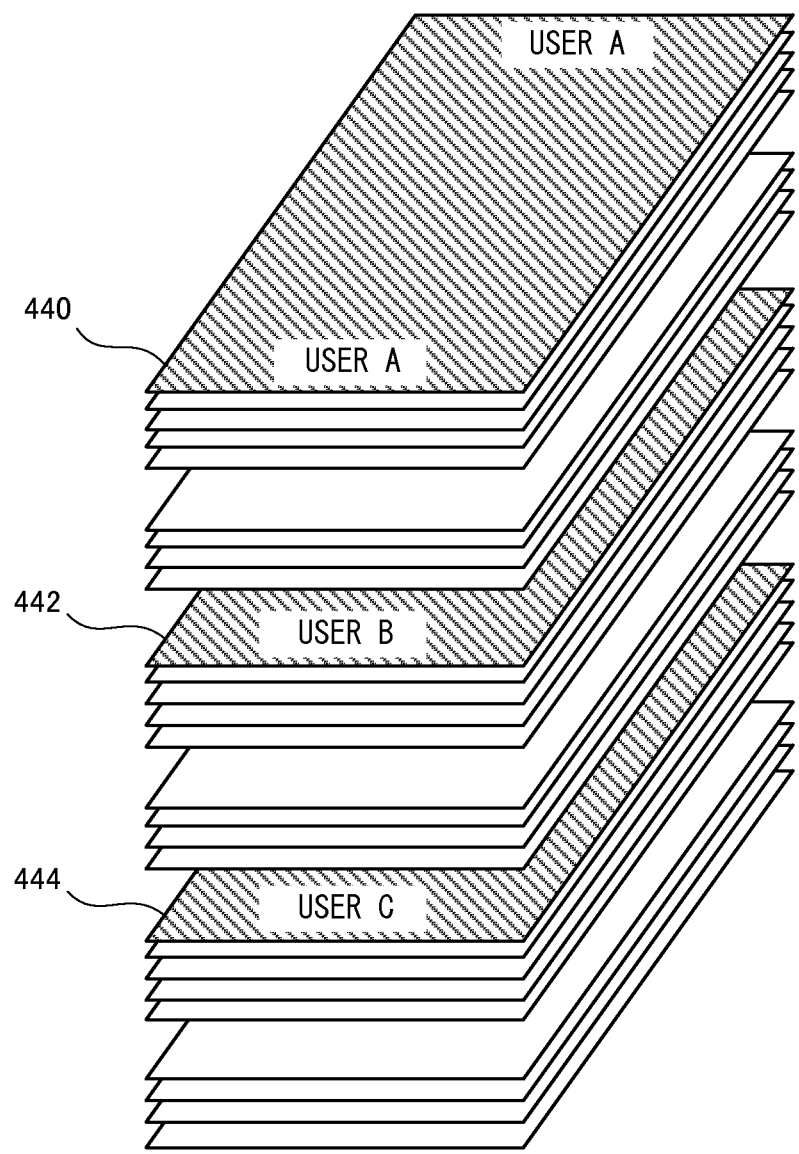
FIG. 22 is a perspective view showing insert-sheets inserted to copies.

As described above, through the process steps 890 to 910, the character or characters to be printed on the insert-sheet and the position of printing are set. By way of example, if the characters to be printed are set as shown in FIG. 21 and the position for inserting insert-sheets is set as shown in FIG. 10, insert-sheets having thus set characters printed are inserted as shown in FIG. 22.

After the conditions related to the insert-sheet are set as described above, when a key (MONO start key 232 or COLOR start key 234) instructing execution of copying is touched in a state in which the basic screen image 200 of copy mode is displayed, the control proceeds in the order of steps 702, 704, 716 and 720.

At step 720, CPU 102 determines whether the insert-sheet specified by the tray setting process of step 760 can be discharged to the same tray as that one to which the copied sheets are discharged. If it is determined possible to discharge to the same tray, the control proceeds to step 724. Otherwise, the control proceeds to steps 722.

At step 722, CPU 102 changes the designated insert-sheet to recording paper that can be discharged to the tray to which the copied sheets are to be discharged. If the image forming apparatus has a plurality of paper discharge trays, the size of recording paper that can be discharged to each discharge tray may be limited by physical restrictions such as dimensions and mechanisms of the image forming apparatus. By way of example, if a document is to be copied to recording paper of A4 size, and if an insert-sheet of A3 size is designated and the A3 size sheet cannot be discharged to the tray which is to receive the copied sheets, CPU 102 sets the tray containing the recording paper of the same size (A4 size) as the recording paper on which images are to be formed in the copy process as the tray containing the insert-sheets.

At step 724, CPU 102 executes document scanning in the above-described manner, and generates image data corresponding to the document on RAM 106 and stores it in HDD 108.

At step 726, CPU 102 controls insert-sheet data generating unit 126 and generates image data of the insert-sheet. Specifically, at step 772 (see FIG. 7), if a character or characters to be printed on the insert-sheet are designated, insert-sheet data generating unit 126 generates image data including the designated characters at designated position on RAM 106 and stores it in HDD 108. If no character to be printed on the insert-sheet is designated at step 772, insert-sheet data generating unit 126 generates image data including a numeral indicating the number of copies at a prescribed position. CPU 102 can determine the numeral indicating the number of copies from the setting related to the insert-sheet inserting position (see FIG. 10). Therefore, CPU 102 transfers the determined numeral to insert-sheet data generating unit 126 and causes insert-sheet data generating unit 126 to generate the image data to be printed on the insert-sheet. Specifically, from the information of position where the insert-sheet is inserted, CPU 102 calculates the number of copies output before the insertion of the insert-sheet, and determines a numeral indicating the number larger by 1 than the number of copies, as the numeral to be printed on the insert-sheet.

At step 728, CPU 102 starts image formation on the sheet of recording paper picked-up and conveyed from the designated paper feed tray, in the manner as described above.

At step 730, CPU 102 counts the number of recording paper discharged to paper discharge tray 91 or 96 while controlling image forming unit 122, and determines whether or not the number of copies has reached a prescribed number to be discharged before discharging the insert-sheet. If it is determined to have reached the prescribed number, the control proceeds to step 734. Otherwise, the control proceeds to step 732.

The number of discharged sheets of recording paper can be detected by a sensor arranged close to conveyer roller pair 12b or 12e. Since the number of sheets of scanned document and the print conditions (the number of document pages of which images are to be formed on one side of paper and the number of sides to be printed on a sheet) are known to CPU 102, taking into account these conditions, CPU 102 can calculate the number of discharged copies, based on the number of sheets of discharged recording paper.

At step 732, CPU 102 executes image formation on a sheet of recording paper.

At step 734, CPU 102 executes image formation on the insert-sheet. Specifically, an insert-sheet is picked-up and conveyed from the designated tray, and an image is formed on the insert-sheet based on the image data generated at step 726. If the character or characters to be printed on the insert-sheet have been designated at step 772, the image data used here is the image data including the designated characters. If no character to be printed has been designated at step 772, the image data is the data including the numeral indicating the number of copies. In any case, CPU 102 can determine the image data to be used for printing on the insert-sheet, from the number of already discharged copies.

At step 736, CPU 102 determines whether or not printing of the designated number of copies is completed. If it is determined to be completed, the control proceeds to step 714. Otherwise, the control returns to step 730.

Through the above-described process, the designated number of copies with the insert-sheets inserted in accordance with the conditions for the insert-sheets set at step 712 are discharged to paper discharge tray 91 or 96. By way of example, if the position for inserting the insert-sheet is set as shown in FIG. 10 and the character to be printed on the insert-sheet is not set at step 772, the resulting copies are as shown in FIG. 11. If the position for inserting the insert-sheet is set as shown in FIG. 10 and the characters to be printed on the insert-sheet as shown in FIG. 21 are set at step 772, the resulting copies are as shown in FIG. 22. Therefore, when a plurality of copies of a document are formed, it is possible for the user to easily sort the resulted prints. Specifically, since insert-sheets are inserted at positions designated on the copy-by-copy basis and each insert-sheet has the number of copies or the designated characters printed thereon, it is unnecessary for the user to count the number of copies, and the user has only to separate the printed sheets before or after each insert-sheet.

Figure 23:
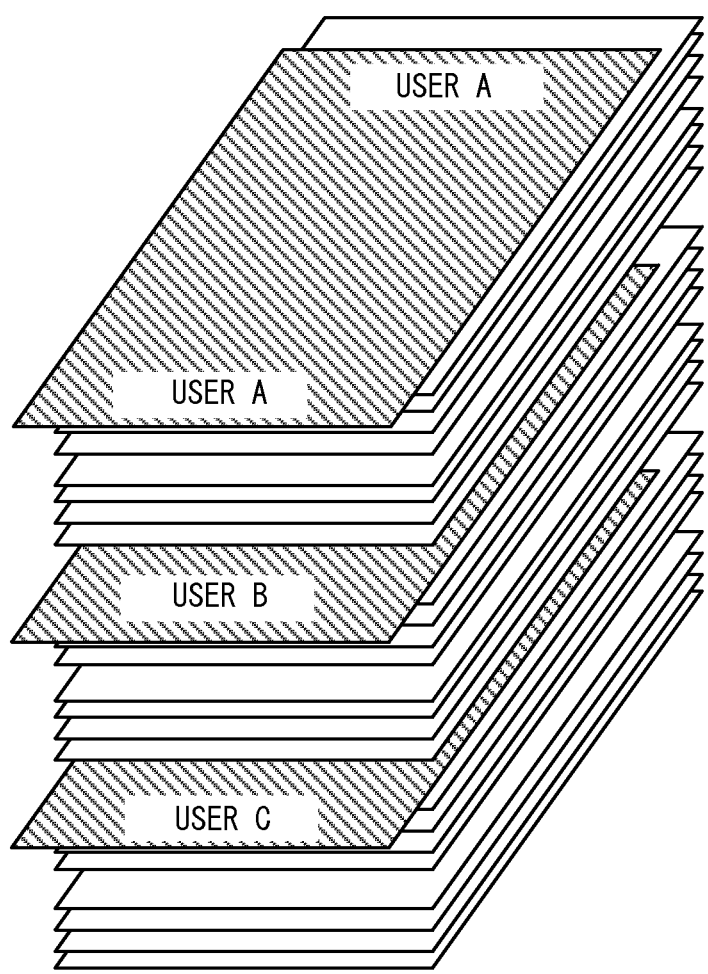
FIG. 23 is a perspective view showing insert-sheets offset and inserted to copies.
Figure 24:
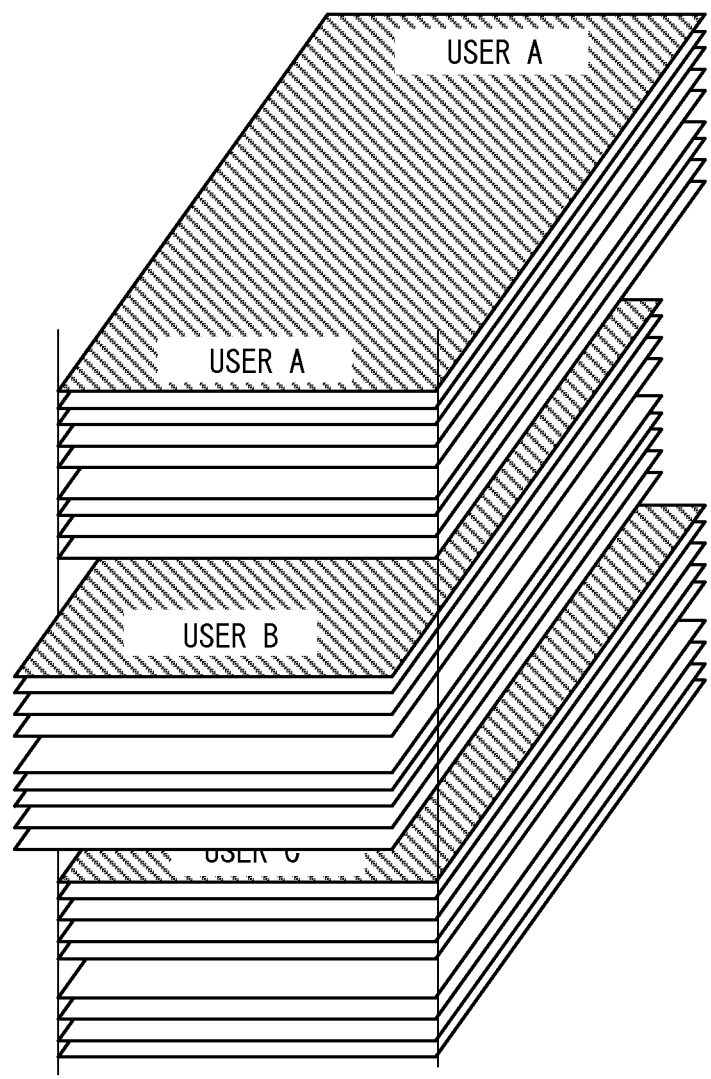
FIG. 24 is a perspective view showing insert-sheets and following recorded sheets offset in a staggered manner.

When the insert-sheet is discharged to paper discharge tray 91 or 96, the insert-sheet may be offset. By way of example, only the insert-sheet may be offset as shown in FIG. 23, or the insert-sheet and the following sheets of recording paper before the next insert-sheet may be offset as shown in FIG. 24.

Though an example in which image forming apparatus 100 is used in the copy mode has been described above, it is not limiting. By way of example, if the image forming apparatus 100 is used in the printer mode, that is, when image forming apparatus 100 receives a print job from an external terminal (computer or the like) through a network and executes printing, the insert-sheet or sheets can be inserted in the similar manner. In that case, when the user designates a file to be printed on the terminal, screen images allowing setting of conditions related to the insert-sheet (for example, FIGS. 8, 10, 13, 15, 16, 18 and 21) may be displayed on a display device of the terminal.

Specifically, a CPU of the terminal displays the screen image allowing setting of insert-sheets on the display device of the terminal, and receives an operation of a mouse or a keyboard provided for the terminal, by the user. The CPU of the terminal sets the conditions related to the insert-sheet in the similar manner as at step 712 (see FIG. 5) described above through the user operation, and generates a print job including the conditions. The CPU of the terminal transmits the generated print job to image forming apparatus 100 through network 190. In accordance with the received print job, image forming apparatus 100 executes steps 726 to 736 of FIG. 5. Thus, results of printing similar to those of FIG. 11 or 22 can be obtained. When the CPU of the terminal generates a print job including the character information to be printed on the insert-sheet and transmits it to the image forming apparatus 100, image forming apparatus 100 executes the process of step 726 (generation of image data to be printed on the insert-sheet). If the CPU of the terminal generates image data to be printed on the insert-sheet and transmits a print job including the image data to image forming apparatus 100, it is unnecessary for image forming apparatus 100 to execute the process at step 726.

The conditions related to the insert-sheet have only to include the information at least of the position to insert the insert-sheet, the tray containing the insert-sheet, and the size of the insert-sheet. Information related to the type of the insert-sheet and the information related to the character or characters to be printed on the insert-sheet are optional.

Further, as the conditions related to the character or characters to be printed on the insert-sheet, conditions other than those described above may be set. For example, it may be possible to allow setting of the font, size, color or the like of characters.

Figure 25:
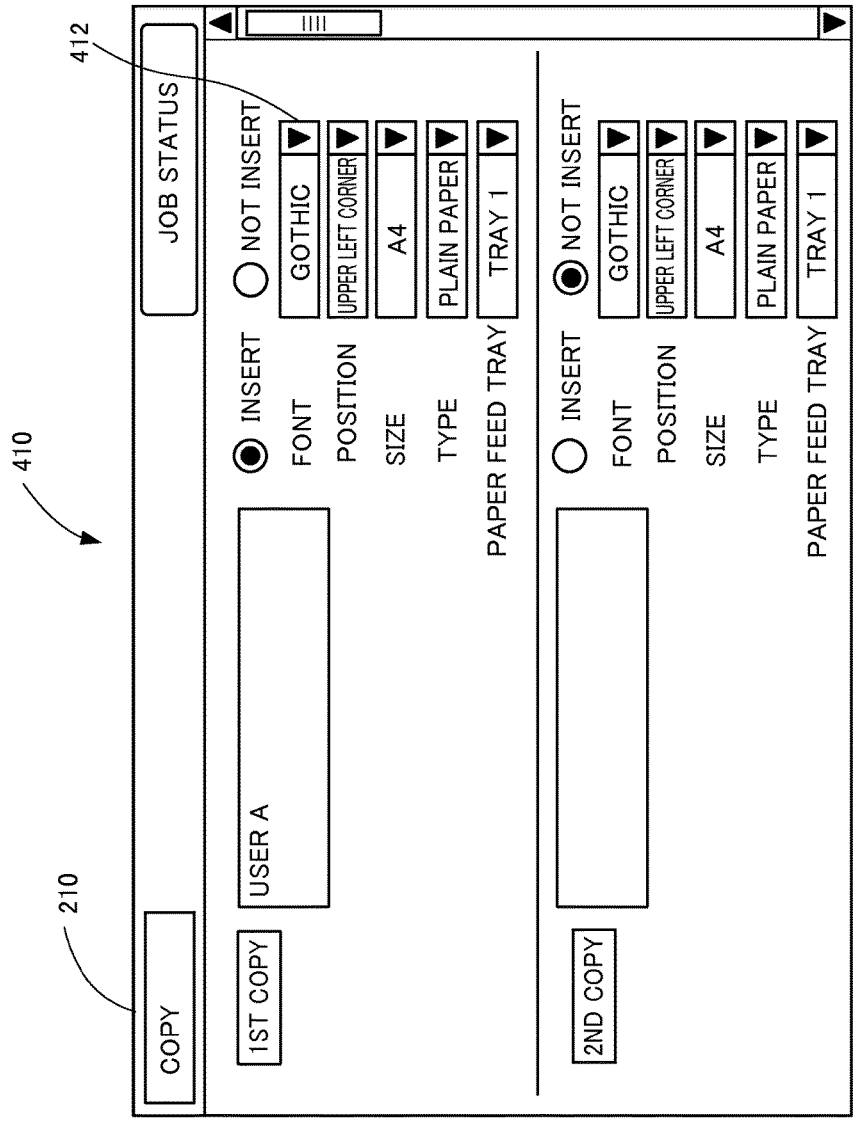
FIG. 25 shows an example of a screen image for simultaneously setting a plurality of conditions of the insert-sheet.

Further, the screen images allowing setting of the insert-sheet are not limited to FIGS. 8, 10, 13, 15, 16, 18 and 21. One screen image that allows setting of a plurality of conditions related to the insert-sheet may be possible. By way of example, a screen image 410 shown in FIG. 25 may be used, in which a pull-down menu 412 is used as a user-interface, allowing setting of conditions related to the insert-sheet by selecting from pre-set options.

Figure 26:
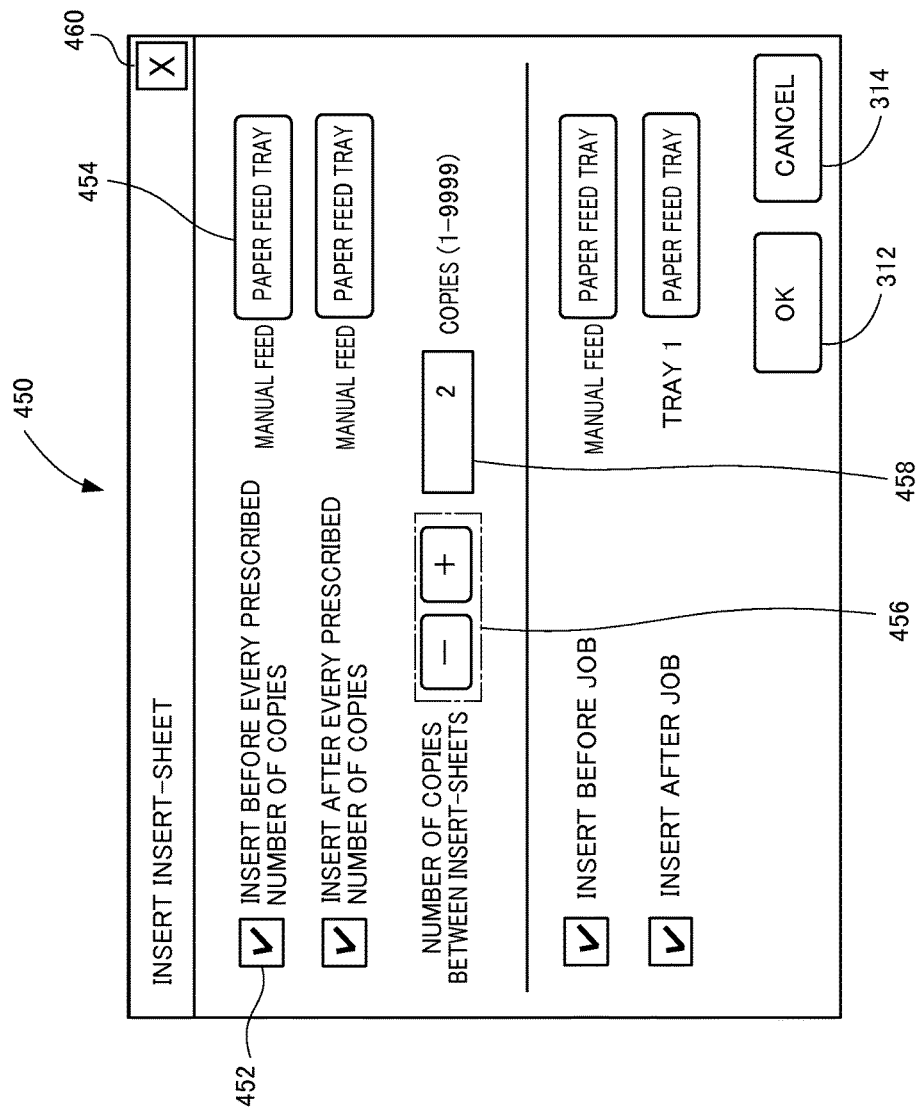
FIG. 26 shows another example of a screen image for setting conditions related to the insert-sheet.

When insert-sheets are to be inserted at any of the positions before the full sets of prints of a job for printing a plurality of copies, after the full sets of prints of a job for printing a plurality of copies, before every prescribed number of copies and after every prescribed number of copies, the conditions related to the insert-sheet can efficiently be set by a screen image 450 shown in FIG. 26. On screen image 450, if a check box 452 on the left side of each of "insert before every prescribed number of copies," "insert after every prescribed number of copies," "insert before job" and "insert after job" is touched, a check mark is displayed, and corresponding setting becomes valid. When the insert-sheet is to be inserted at every prescribed number of copies, the number of copies between each insert-sheet and the next insert-sheet can be entered using an up-down key 456, in the range of 1 to 9999. The entered value is indicated in copy number indication box 458.

The paper feed key 454 is a key for setting the paper feed tray for feeding the insert-sheet to be inserted to each position. When paper feed tray key 454 is touched, a screen image (for example, FIG. 13) allowing selection from paper feed trays 81 to 85 available in image forming apparatus 100 is displayed. On screen image 450, the selected paper feed tray is displayed on the left side of paper feed tray key 454. According to the setting, in FIG. 26, the insert-sheet to be inserted after a job is fed from tray 1 (paper feed tray 81), and other insert-sheets are fed from the manual feed tray (paper feed tray 85).

The process when OK key 312 or CANCEL key 314 is touched is the same as described above. Screen image 450 is an example of a screen image displayed as a sub-screen image displayed on a part of touch-panel display 132, and when "×" key 460 at the upper right corner is touched, the screen image 450 is closed. When "×" key 460 is touched and screen image 450 is closed, the set contents may be saved or discarded, or a confirmation screen asking whether the contents are to be saved or not may be displayed.

Figure 27:
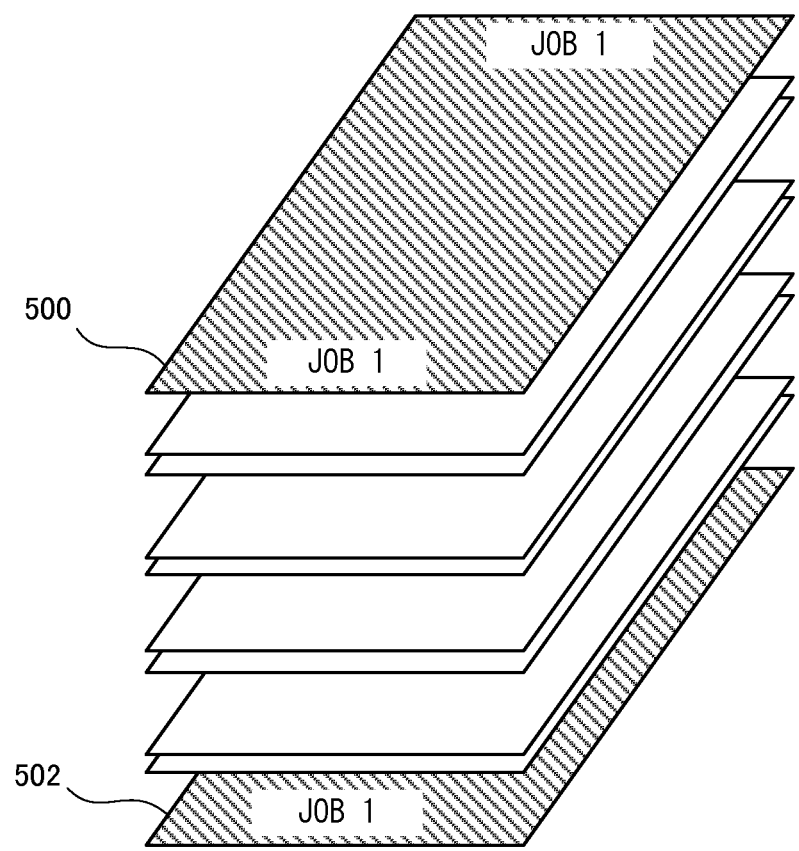
FIG. 27 is a perspective view showing insert-sheets inserted before and after the whole sets of prints.

By operating screen image 450, the user can carry out the process for setting the insertion position of step 756 and the process for setting the tray at step 760 shown in FIG. 7. By way of example, assume that 4 copies of a document of 2 pages are to be provided, and the insert-sheets are set to be inserted before and after the job. Then, insert-sheets 500 and 502 are inserted before and after the full sets of prints, as shown in FIG. 27. In the example of FIG. 27, characters specifying the job (for example, job name) are printed on insert-sheets 500 and 502.

Figure 28:
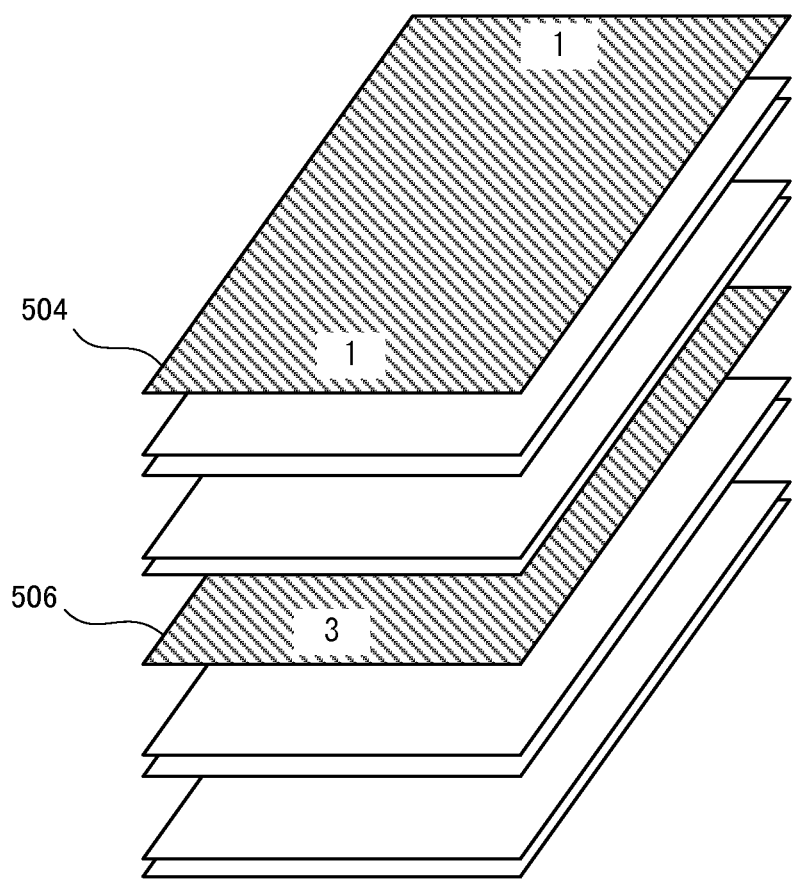
FIG. 28 is a perspective view showing insert-sheets inserted before every two sets of prints.
Figure 29:
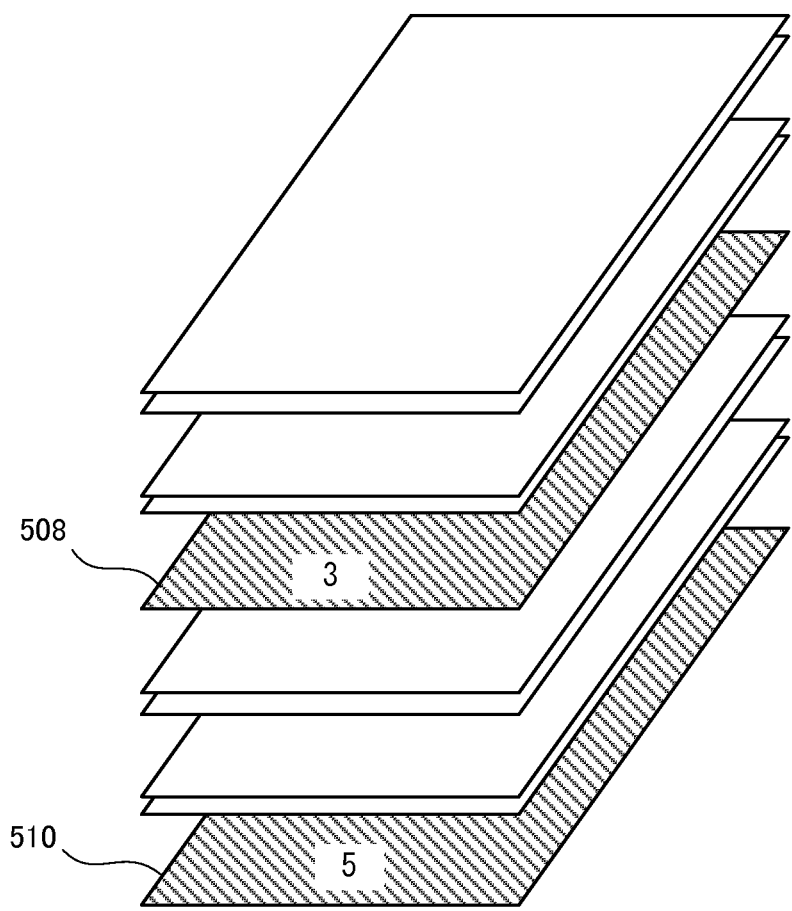
FIG. 29 is a perspective view showing insert-sheets inserted after every two sets of prints.
Figure 30:
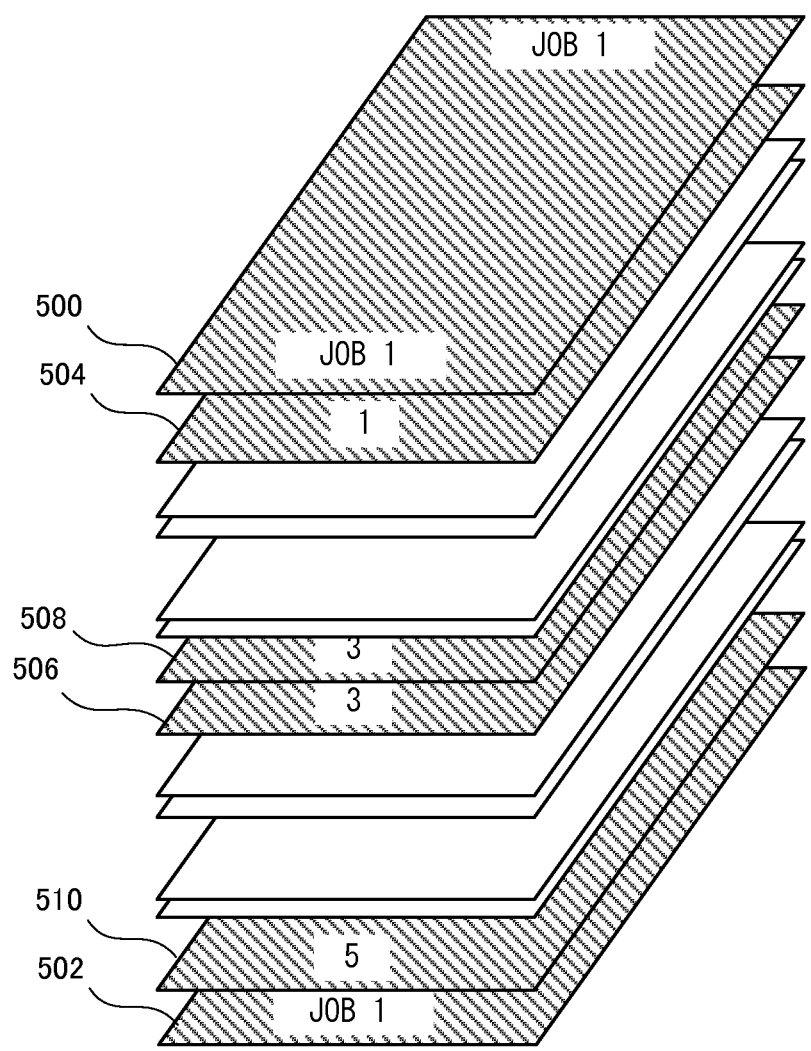
FIG. 30 is a perspective view showing insert-sheets inserted in accordance with the settings shown in FIG. 26.

Assume that 4 copies of a document of 2 pages are to be provided and the insert-sheets are set to be inserted before every two sets of copies. Then, insert-sheets 504 and 506 are inserted as shown in FIG. 28. If the insert-sheets are set to be inserted after every two sets of copies, inserts sheets 508 and 510 are inserted as shown in FIG. 29. In FIGS. 28 and 29, as described above, numerals indicating what number of set of copies follow each insert-sheet is printed on inert-sheets 504 to 510. Therefore, it is possible for the user to easily know the number of copies output before the insert-sheet. Further, with the settings as shown in FIG. 26, a sum of six insert-sheets 500 to 510 are inserted as shown in FIG. 30.

By the above-described setting to insert insert-sheets before and after the entire job, it becomes possible to easily distinguish prints of each job when print jobs received substantially simultaneously from different terminals are executed and prints are continuously discharged to the same paper discharge tray. When insert-sheets are to be inserted as shown in FIGS. 27 to 30, setting of characters to be printed on the insert-sheets may also be allowed using a screen image such as shown in FIG. 21.

It is preferable to pre-set the contents of settings related to the insertion of insert-sheets as default settings in image forming apparatus 100. For instance, if an administrator sets conditions related to the insertion of insert-sheets using screen image 450 and registers the set contents as default settings in image forming apparatus 100, each user can obtain prints with the insert-sheet or sheets inserted, simply by activating the insert-sheet inserting function (for example, simply by touching a key activating insertion of insert-sheets), without any operation on screen image 450.

Further, the information for designating the position to insert the insert-sheet may be any information that enables calculation of the number of copies (including "0") discharged before the first insert-sheet is discharged and the number of copies discharged between consecutively discharged two insert-sheets. These numbers of copies may be directly designated.

If the image forming apparatus is capable of executing post-processing such as punching and stapling on the sheets of recording paper on which images are formed, it is preferred not to execute such a process on the insert-sheet, even if the post-processing is designated.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

According to the image forming apparatus of the present invention, when a plurality of sheets of recording paper having images formed thereon are discharged, it is possible to insert an insert-sheet indicating separation, at an arbitrary position designated on the copy-by-copy basis of the prints.

DESCRIPTION OF THE REFERENCE SIGNS 100 image forming apparatus
102 CPU
104 ROM
106 RAM
108 HDD
110 NIC
112 bus
120 document reading unit
122 image forming unit
124 image processing unit
126 insert-sheet data generating unit
128 recording paper conveying unit
130 operation unit
190 network

The invention claimed is:

1. An image forming apparatus allowing insertion of an insert-sheet indicating separation between a plurality of sheets of recording paper each having an image formed on its surface and then discharged, comprising:
   an image forming device forming an image on the recording paper;
   an input device designating insertion positions to insert said insert-sheet at said designated insertion positions;
   a discharge device discharging said recording paper having the image formed thereon and said insert-sheet; and
   one or more processing devices and one or more memory devices storing instructions to control said discharge device to:
   discharge said insert-sheet at said designated insertion positions and discharge every other insert-sheet with an offset in a prescribed direction, and discharge sheets of recording paper, following an insertion-sheet discharged with the offset, with the offset in the prescribed direction until a following insertion-sheet is discharged.

2. The image forming apparatus according to claim 1, wherein the one or more processing devices and the one or more memory devices further storing instructions to:
   designate a paper feed tray from which said insert-sheet is fed; and
   cause said discharge device to pick up and discharge said insert-sheet from said designated paper feed tray.

3. The image forming apparatus according to claim 1, further comprising:
   a size designating device allowing a user to designate a size of said insert-sheet, wherein
   the one or more processing devices and the one or more memory devices further storing instructions to:
   determine whether an insert-sheet of the size designated by said size designating device can be discharged to a discharge destination to which said recording paper having the image formed thereon is discharged; and
   in response to the determination that said insert-sheet cannot be discharged to said discharge destination, control said discharge device such that a sheet of recording paper is picked up from a tray containing said recording paper on which the image is to be formed and discharged in place of said insert-sheet.

4. The image forming apparatus according to claim 1, wherein
   said image forming device forms an image on a part of a peripheral portion of said insert-sheet which is not overlapped with a discharged sheet of recording paper when the insert-sheet is discharged with the offset in said prescribed direction by said discharge device.

5. The image forming apparatus according to claim 4, further comprising:
   a character input device allowing a user to input of a character, wherein
   said image formed on said part of said insert-sheet is an image of a character input through said input device.

6. A method of controlling an image forming apparatus for inserting an insert-sheet indicating separation between a plurality of sheets of recording paper each having an image formed on its surface, comprising the steps of:
   forming an image on the recording paper;
   designating an insertion positions to insert said insert-sheet; and
   discharging said recording paper having the image formed thereon and said insert-sheet, wherein
   said discharging step includes,
   discharging said insert-sheets at said designated insertion positions and discharging every other insert-sheet with an offset in a prescribed direction, and
   discharging sheets of recording paper, following an insertion-sheet discharged with the offset, with the offset in the prescribed direction until a following insertion-sheet is discharged.

* * * * *